(12) United States Patent
Gunderson, III et al.

(10) Patent No.: US 6,485,229 B1
(45) Date of Patent: Nov. 26, 2002

(54) CONTAINMENT/EXCLUSION BOOM AND METHODS OF USING THE SAME

(75) Inventors: William F. Gunderson, III, Astoria, OR (US); Harold B. Dreyer, Anchorage, AK (US); Dennis Nottingham, Anchorage, AK (US)

(73) Assignee: Gunderboom, Inc., Anchorage, AK (US)

( * ) Notice: Subject to any disclaimer, the term of this patent is extended or adjusted under 35 U.S.C. 154(b) by 0 days.

(21) Appl. No.: 09/168,491

(22) Filed: Oct. 8, 1998

Related U.S. Application Data

(60) Provisional application No. 60/061,595, filed on Oct. 10, 1997.

(51) Int. Cl.[7] .............................................. E02B 15/04
(52) U.S. Cl. ........................ 405/63; 210/242.2; 210/923
(58) Field of Search .............................. 405/60, 63, 65; 210/923, 242.1, 242.2; 102/303

(56) References Cited

U.S. PATENT DOCUMENTS

| | | | | |
|---|---|---|---|---|
| 2,699,117 A | * | 1/1955 | La Prairie | 102/305 |
| 3,659,713 A | | 5/1972 | Mueller | 210/776 |
| 3,713,540 A | * | 1/1973 | Davidson et al. | 210/391 |
| 3,979,289 A | * | 9/1976 | Bykowski et al. | 210/784 |
| 4,178,245 A | * | 12/1979 | Nakaoka et al. | 210/791 |
| 4,219,423 A | * | 8/1980 | Smith, Jr. | 210/169 |
| 4,288,321 A | | 9/1981 | Beane | 210/170 |
| 4,296,884 A | | 10/1981 | Luebke | 238/2 |
| 4,419,232 A | | 12/1983 | Arntyr et al. | 210/164 |
| 4,582,048 A | * | 4/1986 | Sorensen | 126/565 |
| 4,669,972 A | | 6/1987 | Koblanski | 431/2 |
| 4,692,059 A | | 9/1987 | Juutilainen | 405/63 |
| 4,749,479 A | | 6/1988 | Gray | 210/170 |
| 4,880,333 A | | 11/1989 | Glasser et al. | 405/43 |
| 4,919,820 A | | 4/1990 | Lafay et al. | 210/671 |
| 5,102,261 A | | 4/1992 | Gunderson, III | 405/70 |
| 5,197,821 A | | 3/1993 | Cain et al. | 405/68 |
| 5,220,958 A | | 6/1993 | Bernhardt | 166/67 |
| 5,225,622 A | * | 7/1993 | Gettle et al. | 102/303 X |
| 5,322,629 A | | 6/1994 | Stewart | 210/767 |
| 5,345,741 A | | 9/1994 | Slater et al. | 52/646 |
| 5,354,456 A | | 10/1994 | Montgomery et al. | 210/170 |
| 5,354,459 A | | 10/1994 | Smith | 210/188 |
| 5,372,711 A | * | 12/1994 | Sill | 210/122 |
| 5,394,786 A | * | 3/1995 | Gettle et al. | 102/303 X |
| 5,427,679 A | | 6/1995 | Daniels | 210/170 |
| 5,558,462 A | | 9/1996 | O'Haver | 405/81 |
| RE36,297 E | * | 9/1999 | Heino et al. | 210/784 |
| 5,992,104 A | * | 11/1999 | Hudak | 405/211 X |

FOREIGN PATENT DOCUMENTS

| | | |
|---|---|---|
| FR | 2195-238 | 8/1972 |
| FR | 2284-709 | 9/1974 |
| FR | 2329-808 | 11/1975 |
| FR | 2579-239 A | 3/1985 |
| GB | 2 246 981 A | 2/1992 |
| WO | WO 91/07546 | 5/1991 |

\* cited by examiner

Primary Examiner—Christopher J. Novosad
(74) Attorney, Agent, or Firm—Nixon Peabody LLP

(57) ABSTRACT

The present invention relates to a method of controlling movement of suspended particulates or marine life in a body of water. The method includes introducing into the body of water containing suspended particulates or marine life a containment/exclusion boom having a curtain formed of a flexible fabric that controls the passage of suspended particulates or marine life through the curtain and injecting a gas into the water in a manner effective substantially to remove fouling material from the curtain. Further, the present invention relates to a method of cleaning fouling material from a boom curtain suspended in a body of water, a containment/exclusion boom for controlling movement of suspended particulates or marine life in a body of water, and use of the boom of the present invention for filtering intake water or reducing transmission of energy of the shock wave of an underwater explosion.

38 Claims, 21 Drawing Sheets

CONTAINMENT/EXCLUSION BOOM AND METHODS OF USING THE SAME

This application claims the benefit of provisional U.S. patent application serial No. 60/061,595 filed Oct. 10, 1997.

FIELD OF THE INVENTION

The present invention relates to a method and apparatus for controlling movement of suspended particulates and/or marine life in a body of water. More specifically, the present invention relates to a containment/exclusion boom and a method of controlling movement of suspended particulates and/or marine life.

BACKGROUND OF THE INVENTION

Industrial plants and power plants utilize water from nearby water sources for cooling purposes. Consequently, a problem of the ingestion of particulates or marine life (e.g., fish, fish eggs, larvae, zebra mussels, vegetation, etc.) into the cooling system water intakes by suction, random entry, or other means is created. The same problem exists in any similar facility where water or materials in the water are required for some purpose and are obtained from water bodies containing particulates and/or marine life.

Floating barrier or containment boom systems have been devised to contain pollutants in lakes and seas. Typically, they employ a series of buoyant boom sections that have segments of curtains or skirts attached thereto. The curtains are typically made of water-impervious, non-oil-absorbent, flexible sheet material. The curtains extend downward into the water below the boom section and are usually stabilized by at least a weighted ballast integrated into the lower edge of the curtain. These systems employ various, sometimes elaborate, mechanical means for securing boom sections to curtain segments and for interconnecting boom curtain sections to form a continuous containment system. Such booms may be provided in small sections and require extensive subassembly prior to deployment, which represents an increase in labor requirements as well as an increase in deployment time. These increases represent an increased cost and delay in deployment of containment boom systems.

Some containment systems employ a series of cables, wires, and other structural supports to provide rigidity and/or stability to the curtain segments and the system as a whole. Due to the rigidity, some prior art booms are susceptible to the movement of contaminants beneath the boom curtain. When exposed to wind-generated currents, tidal currents, or wave conditions, such booms have been known to break under the load, to be overtopped by waves, or to have pollutants propelled over and under the boom. Inadequate curtain length also contributes to the passage of contaminants beneath the containment system.

Further, the materials used in these conventional containment systems may be sensitive to certain environmental conditions (e.g., pollutants, salt water, and ultraviolet light) and, thus, too quickly deteriorate. For instance, metal parts may rust and corrode. Further, these curtain fabrics may lose flexibility or crack at low temperatures, or may deteriorate due to prolonged exposure to ultraviolet light.

In addition, conventional containment systems are not adapted for use in certain exclusion applications, such as preventing suspended particulates or marine life from entering water intake systems. With most boom systems used in controlling water pollutants, water passes in two directions (i.e., during tidal fluctuations). Accordingly, any suspended particulates or marine life that may attach to the boom curtain is washed away from the boom curtain by the reversal of direction of the water flow. With the use of such conventional boom systems in controlling suspended particulates or marine life from entering a water intake, the water only passes in one direction, which means that the curtain material will become clogged with suspended particulates or marine life contained in the water and the containment system will fail. Moreover, most conventional containment systems are also not equipped to handle significant uni-directional flow rates employed in many water intake systems. The stresses placed on conventional containment system by the water flow may itself cause the containment system to fail.

U.S. Pat. No. 5,102,261 to Gunderson, III ("Gunderson") relates to a floating containment boom for containment and isolation of water-born pollutants. The containment boom includes a flotation unit, a ballast, a continuous curtain of at least one sheet of geosynthetic fabric, and at least two tow cords. Gunderson, however, does not disclose a satisfactory method of controlling marine life from entering water intake structures. Further, Gunderson does not disclose a means of removing fouling material from the curtain, nor does it disclose a means of preventing damage to the curtain in the event that the curtain becomes fouled by particulates or marine life.

The present invention is directed toward overcoming these deficiencies.

SUMMARY OF THE INVENTION

The present invention relates to a method of controlling movement of suspended particulates or marine life in a body of water. The method includes introducing into the body of water containing suspended particulates or marine life a containment/exclusion boom having a curtain formed of a flexible fabric that controls the passage of suspended particulates or marine life through the curtain and injecting a gas into the water in a manner effective substantially to remove fouling material from the curtain.

Another aspect of the invention relates to a method of cleaning fouling material from a boom curtain suspended in a body of water. The method includes injecting a gas into the water in a manner effective substantially to remove fouling material from the boom curtain.

A further aspect of the invention relates to a containment/exclusion boom for controlling movement of suspended particulates or marine life in a body of water. The boom includes a support system positioned in the body of water which has a floor and a water surface. A curtain made of a flexible fabric that allows movement of water therethrough and controls the passage of suspended particulates or marine life therethrough is connected to the support system with the curtain extending substantially from the floor to a position at or above the water surface. The boom also includes a gas injection system for injecting gas into the body of water, whereby the gas substantially removes fouling material from the curtain.

According to another aspect of the present invention, the containment/exclusion boom of the present invention is suitable for reducing transmission of energy from the shock wave of an underwater explosion. This aspect relates to a method that includes introducing into a body of water a first boom system which substantially surrounds a detonation site, the first boom system having a curtain having two sheets of flexible fabric, and injecting a gas between the two sheets of flexible fabric before detonation of an underwater explosive at the detonation site.

Yet another aspect of the present invention relates to a method of filtering intake water for a plant, such as a power plant or the like. The method includes securing a containment/exclusion boom of the present invention in a body of water about a water intake system and periodically injecting a gas into the water in a manner effective substantially to remove fouling material from the curtain of the boom.

The containment/exclusion booms of the present invention are able to be used in a method of controlling marine life from entering intakes, because fouling material may be cleaned from the boom curtain. In addition, removing fouling material from the curtain reduces the stress placed on the boom by the water flow, thereby minimizing and/or preventing damage to the boom as well as preventing the curtain from being ripped away from its anchoring system.

DETAILED DESCRIPTION OF THE INVENTION

Figures 1, 2, 3:
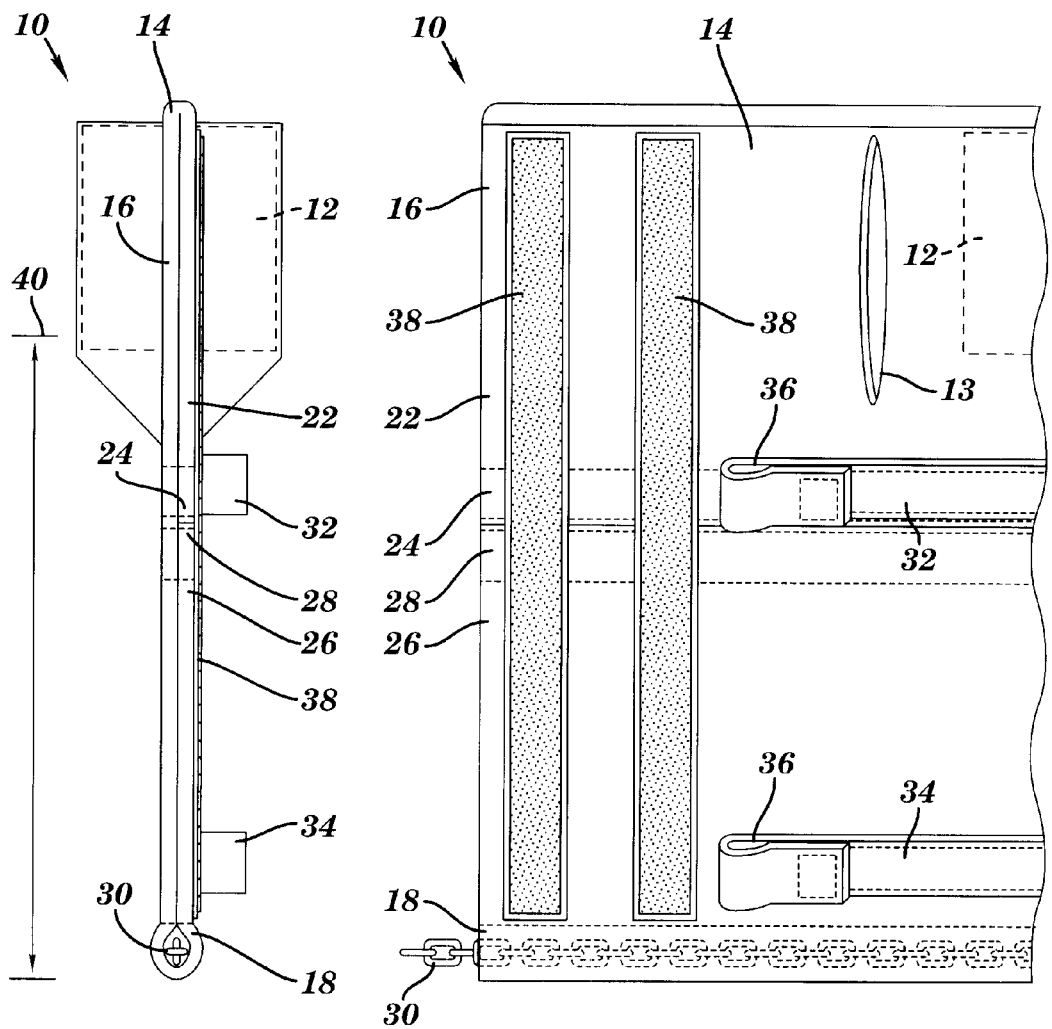
FIG. 1 is a fragmentary, top plan view of one embodiment of a boom according to the present invention.
FIG. 2 is a cross-sectional view of the boom of FIG. 1.
FIG. 3 is a fragmentary, front elevational view of the boom of FIG. 1.

The present invention relates to a method of controlling movement of suspended particulates or marine life in a body of water where the body of water contains the suspended particulates or marine life. The method includes introducing into the body of water a containment/exclusion boom having a curtain formed of a flexible fabric that controls the passage of suspended particulates or marine life through the curtain. The method also includes injecting a gas into the water in a manner effective substantially to remove fouling material from the curtain.

The fabric can be any woven or non-woven material or materials. Preferably the fabric is a geosynthetic fabric. As used herein, the term "geosynthetic fabric" includes geotextiles, engineering fabrics, and filter fabrics and is defined to mean a water-pervious sheet of plastic fibers, filaments, or yarns that have been formed into a stable network such that the fibers, filaments, or yarns retain their relative position to each other. Generally, the geosynthetic fabric may be any type of fabric suitable for use as a boom curtain having the desired characteristics. The geosynthetic fabric may be a woven product or a nonwoven, random construction of fibers.

As used herein, the term "suspended particulates" includes any organic or inorganic matter that is present in the water column of a body of water, including, but not limited to, all types of debris such as grass, bacteria, fungi, fecal coliform, cryptosporidium, silt particles, and silt particles laden with a pollutant such as heavy metals, creosote, PCBs or other hydrocarbon contaminants, etc.

As used herein, the term "marine life" includes but is not limited to mammals, amphibians, reptiles, fish, fish eggs, fish larvae, zebra mussels and other mollusca, seagrass and other aquatic plantlike or algae, crustaceans, etc.

As used herein, the term "fouling material" includes matter or lifeforms, including but not limited to the matter or lifeforms enumerated as suspended particulates or marine life which is contained in sea, river, or lake water.

Certain aspects of the containment/exclusion boom of the present invention are generally described in U.S. Pat. No. 5,102,261 to Gunderson, III, which is hereby incorporated by reference.

The containment/exclusion boom of the present invention generally includes a support system, a curtain, and a gas injection system. The support system, which is intended to be either permanently or temporarily placed in a body of water, serves the function of maintaining the curtain in position over substantially the entire water column (i.e., from the floor to the water surface). Suitable support systems include floating structures, buoyant materials, pilings, or other known structures or materials. The curtain is made of a flexible fabric that allows water to move through the curtain while, at the same time, the flexible fabric controls or minimizes the passage of suspended particulates or marine life through the curtain. The gas injection system injects a gas (e.g., air) into the water in proximity to the curtain such that the rising gas causes fouling material substantially to be removed from the curtain.

Figure 4:
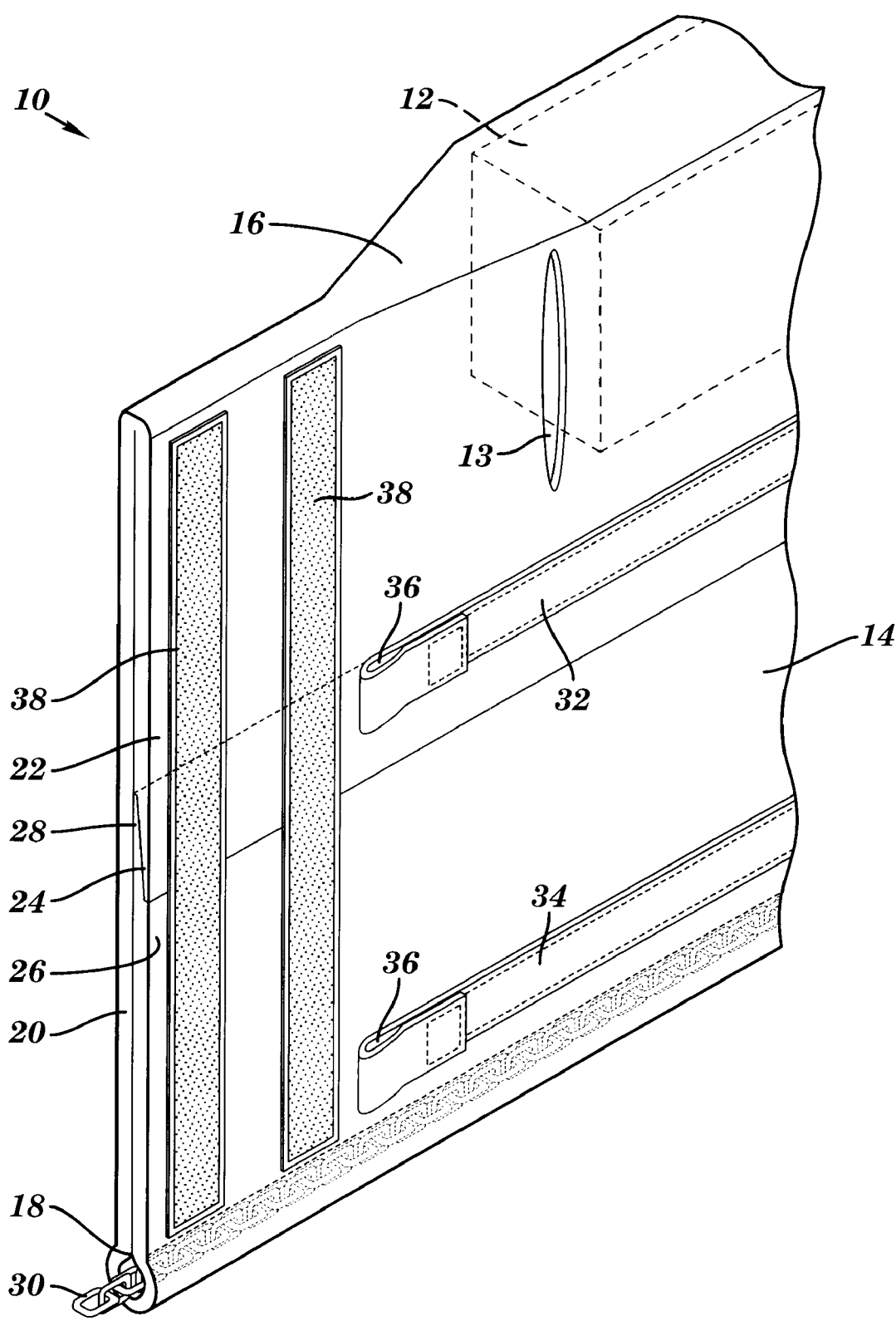
FIG. 4 is a fragmentary perspective view of one segment of the boom of FIG. 1.

One embodiment of the present invention is shown in FIGS. 1–8. More particularly, as shown in FIGS. 1–6, for purposes of illustration, the invention is embodied in a containment/exclusion boom indicated generally by reference numeral 10. As shown in FIGS. 2–4, the boom 10 includes one or more flotation units 12, which collectively serve as the support system, and a curtain 14. Curtain 14 has an upper first sleeve 16 and a lower second sleeve 18, with a main sheet portion 20 extending therebetween. As shown in FIGS. 2–8, curtain 14 includes two sheets of geosynthetic fabric, however, curtain 14 may be formed of a single sheet of geosynthetic fabric or a plurality of sheets of geosynthetic fabric. First sleeve 16 is constructed by folding an upper first edge portion 22 of the sheet of geosynthetic fabric along a lengthwise fold line and securing first edge portion 22 toward a lengthwise edge 24 thereof to main sheet portion 20. Flotation unit 12, which may comprise one or more blocks of buoyant material, can then be inserted, when desired, into slits 13 cut in first sleeve 16 at predetermined intervals. The slits may be either horizontal or vertical. In adverse wave and weather conditions, the flotation unit 12 must be selected to provide sufficient buoyancy to keep the boom 10 afloat and to maintain freeboard. Conventional flotation units usable with the present invention include inflatable devices, air bags, and floats made from buoyant materials, such as cork, synthetic foams, and other plastics. However, conventional devices may not perform adequately under adverse conditions.

It has been found that under adverse conditions, expanded polystyrene ("EPS") is especially suitable for use as the flotation unit 12. It is desirable to coat or seal the EPS to prevent deterioration associated with prolonged exposure to the elements. EPS is commercially available from ARCO Chemical Company as DYLITE™ and can be formed or molded into flotation units of various sizes and shapes (e.g., cylindrical, square, etc.) as required by project design. The EPS has a positive buoyancy that keeps the flotation unit 12 above the water surface at all times, allowing the flotation unit to ride the waves, even in adverse conditions. An EPS flotation unit is not deformed by wave action and does not lose buoyancy if punctured, as would an inflatable device. A single cubic foot of EPS can support as much as 60 lbs. A commonly used size of flotation unit of EPS is 12"×12"×8', but the size can be readily adapted to meet specific wave and environmental conditions and depth requirements.

Alternatively, first edge portion 22 of curtain 14 can be folded around flotation unit 12 and then secured to main sheet portion 20, forming the first sleeve 16 with the flotation unit 12 therein. If an inflatable flotation unit is used, first sleeve 16 may additionally be provided with inlets/outlets (not shown) for valves (not shown) used to inflate and deflate the flotation unit.

To produce a curtain 14 having two sheets of flexible geosynthetic fabric, lower second edge portion 26 of main sheet 20 is folded along a lengthwise fold line and lower second edge portion 26 is secured toward lengthwise edge 28 to main sheet portion 20 directly adjacent and parallel to lengthwise edge 24. Preferably, lengthwise edge 28 and lengthwise edge 24 are in direct contact. Alternatively, as shown in FIG. 4, lengthwise edge 24 and lengthwise edge 28 overlap.

If additional sheets of geosynthetic fabric are desired, additional sheets can be secured to curtain 14 in a similar manner as described above.

Second sleeve 18 is constructed by securing a portion of the sheet of geosynthetic fabric in between second edge portion 26 and the lengthwise fold line to main sheet portion 20.

A ballast 30 is positioned in the second sleeve 18. Typically, the ballast 30 is a continuous length of chain or cable of sufficient weight to hold the main sheet portion 20 of the curtain 14 in a substantially vertical orientation below the flotation unit 12. Ballasts such as lengths of steel chain (from less than ⅜ inch to over ¾ inch) and steel cable (from less than ¾ inch to over 1½ inches in diameter) have been used. Of course, chains and cables of greater or less diameter may be used to meet the specific requirements of a project design.

Figure 6:
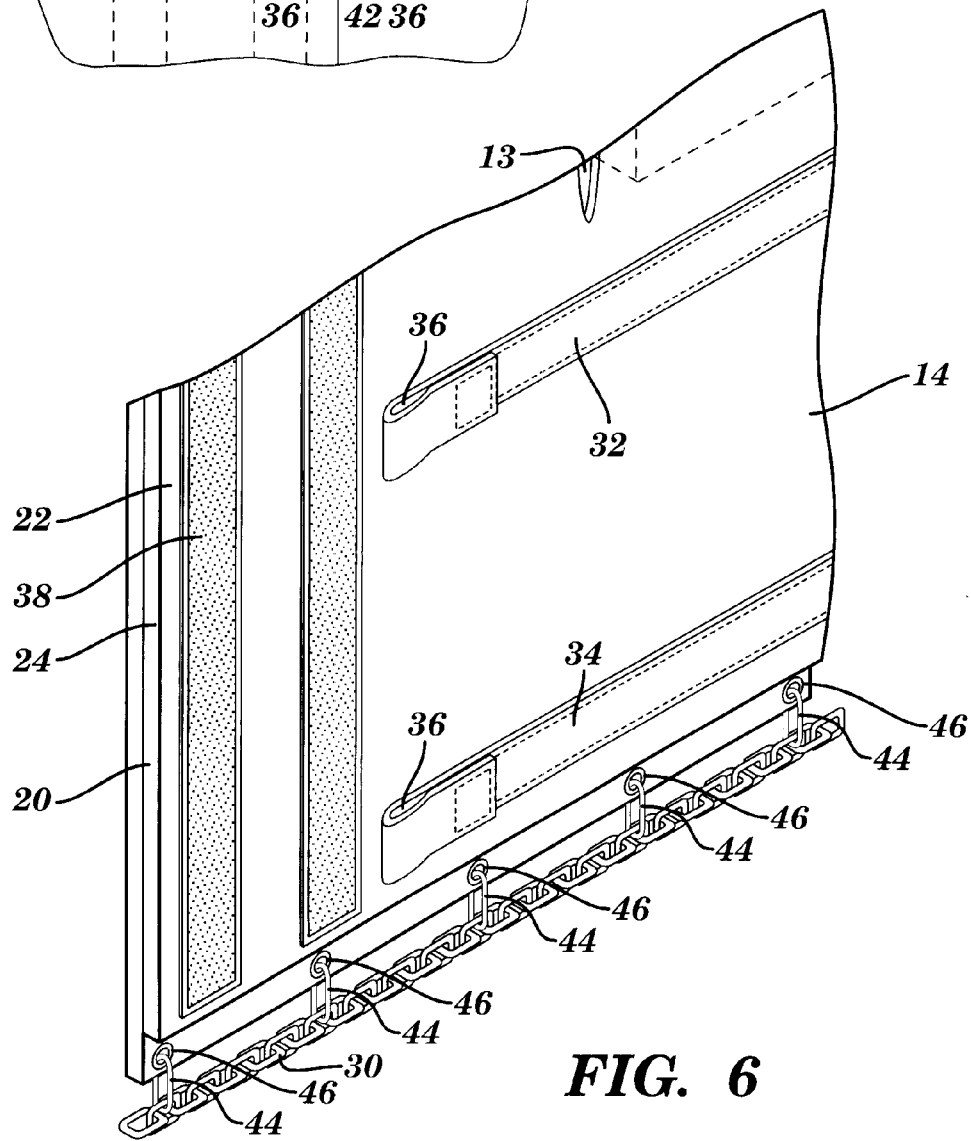
FIG. 6 is a fragmentary, perspective view of a second embodiment of the boom of the present invention.

It is not always necessary to form the second sleeve 18 to contain ballast. Ballast chains, cable, or weighted cable can be tied with wire to the curtain 14 at its bottom or secured to the curtain by other means. For example, as shown in FIG. 6, the ballast 30 is attached to the lower edge portion of the curtain with wires 44 through holes or grommets 46 or the like, which are formed in the bottom portion of the curtain.

In adverse wave and current conditions, the ballast 30 alone may not be sufficient to maintain the containment boom 10 in place or the curtain 14 in a substantially vertical orientation. It would therefore be desirable to employ an anchor or a series of anchors (not shown) to secure the boom in place. The anchors can be attached to the bottom of the curtain 14 or to the ballast 30. For booms of considerable length, anchors preferably are attached at regular intervals. Anchor location may be marked by brightly colored buoys, as necessary. The anchoring system can consist of, for example, chains, anchors, blocks, or various combinations thereof depending upon the particular application.

Figure 8:
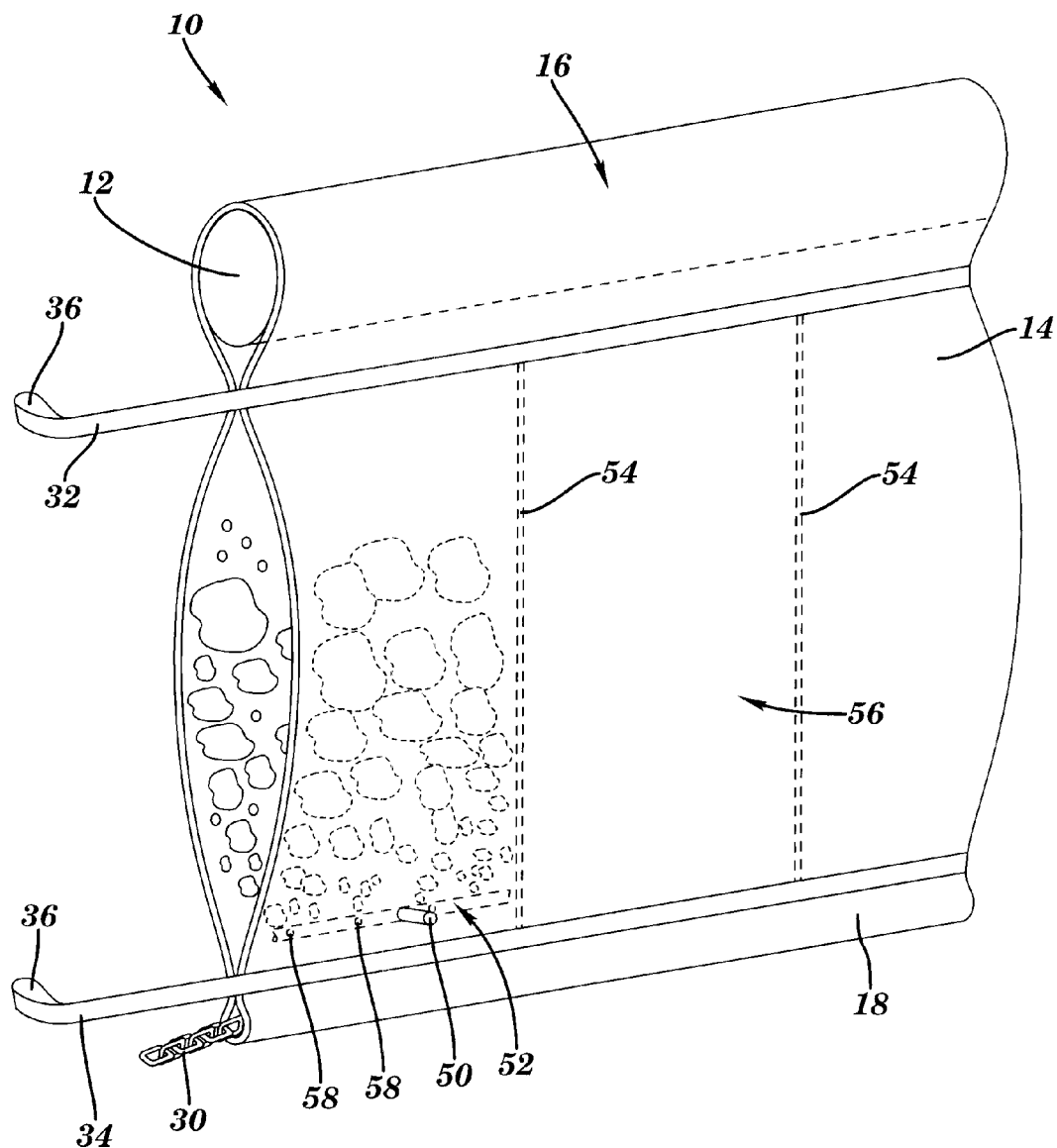
FIG. 8 is a fragmentary perspective view of the boom of FIG. 7.

Preferably, as shown in FIG. 8, the sheets of geosynthetic fabric are attached together to form distinct curtain panels 56. It is desirable for the panels to be formed by securing the plurality of sheets of geosynthetic fabric to each other, for example, at approximately five to eight foot intervals; however, larger or smaller panels can be used. The upper and lower edges can be easily secured to the main sheet portion and the plurality of sheets of the geosynthetic fabric can be easily secured to each other to form panels, for instance, by sewing or heat fusion.

The layers forming the plurality of sheets of geosynthetic fabric could be of the same geosynthetic fabric or different fabrics. For instance, a curtain might have a first layer of nonwoven fabric and a second layer of a woven fabric, which would tend to be more abrasive-resistant than the nonwoven fabric. In addition, the multiple layers of fabric give the boom curtain added strength or protection against abrasion. Depending on how the layers of fabric are connected together, the stiffness of the curtain can be adjusted.

A significant aspect of the present invention is the use of a geosynthetic fabric, such as a geotextile material, or filter fabric for the curtain 14. The geosynthetic fabric can be "hydrophobic" or "water-pervious", meaning that water passes through the fabric. This water pervious property of the geosynthetic fabric permits the passage of water current through the main body portion 20 of the curtain 14, thereby maintaining the relative shape and position of the boom even in adverse current conditions, and also facilitates towing.

The geosynthetic fabric may be "oleophilic," meaning that it absorbs or attracts oil, thereby blocking the flow of oil. For containment of silt and other suspended particulates, it is not essential that the curtain be oleophilic; obviously, for containment of oil, the curtain preferably is oleophilic. However, geosynthetic fabrics that are oleophilic can be used for controlling movement of contaminants such as, for example, creosote, PCBs, and other toxic or harmful hydrocarbons which may be associated with silt. Useful geosynthetic fabrics are further characterized by high load distribution capacity, the ability to abate material filtration, and permeability to water. Geosynthetic fabrics are commercially available in a range of tensile strengths, permeabilities, and permitivities, and are useful for the purposes of the invention throughout those ranges.

It has been discovered that geosynthetic fabrics have some ability to filter or trap bacteria. This is a particularly desirable property for applications of water used for human purposes. Medical and human wastes carry with them a very real potential for bacterial infection. In addition, the geosynthetic fabric of the present invention appears to prevent marine growth on the fabric.

Geosynthetic fabric may be prepared using one or a combination of various polymers, for example polyester, polypropylene, polyamides, and polyethylene. Most commercially available geosynthetic fabrics are polypropylene or polyester. Examples of suitable nonwoven geosynthetic fabrics include, but are not limited to, AMOPAVE® 4399, AmoPave® HD 4597, 4545, 4553, 4557, and 4561 (all polypropylene fabrics commercially available from Amoco Fabrics and Fibers Company); TYPAR™, a polypropylene fabric commercially available from DuPont; TREVIRA® Spunbond, a polyester fabric commercially available from Hoechst Fibers Industries. Examples of suitable woven geosynthetic fabrics include, but are not limited to, 1380 SILT STOP®, 1198, 1199, 2090, 2000, 2006 (all polypropylene fabrics commercially available from Amoco Fabrics and Fibers Company).

One of ordinary skill in the art would be able to select appropriate geosynthetic fabrics to meet project-specific design requirements without undue experimentation.

The geosynthetic fabrics are non-biodegradable, so they do not deteriorate due to environmental exposure. During prolonged use, exposure to ultraviolet (UV) light may cause some geosynthetic fabrics to weaken or deteriorate. However, UV-resistant fabrics are commercially available as well as UV resistance treatment methods.

Figure 7:
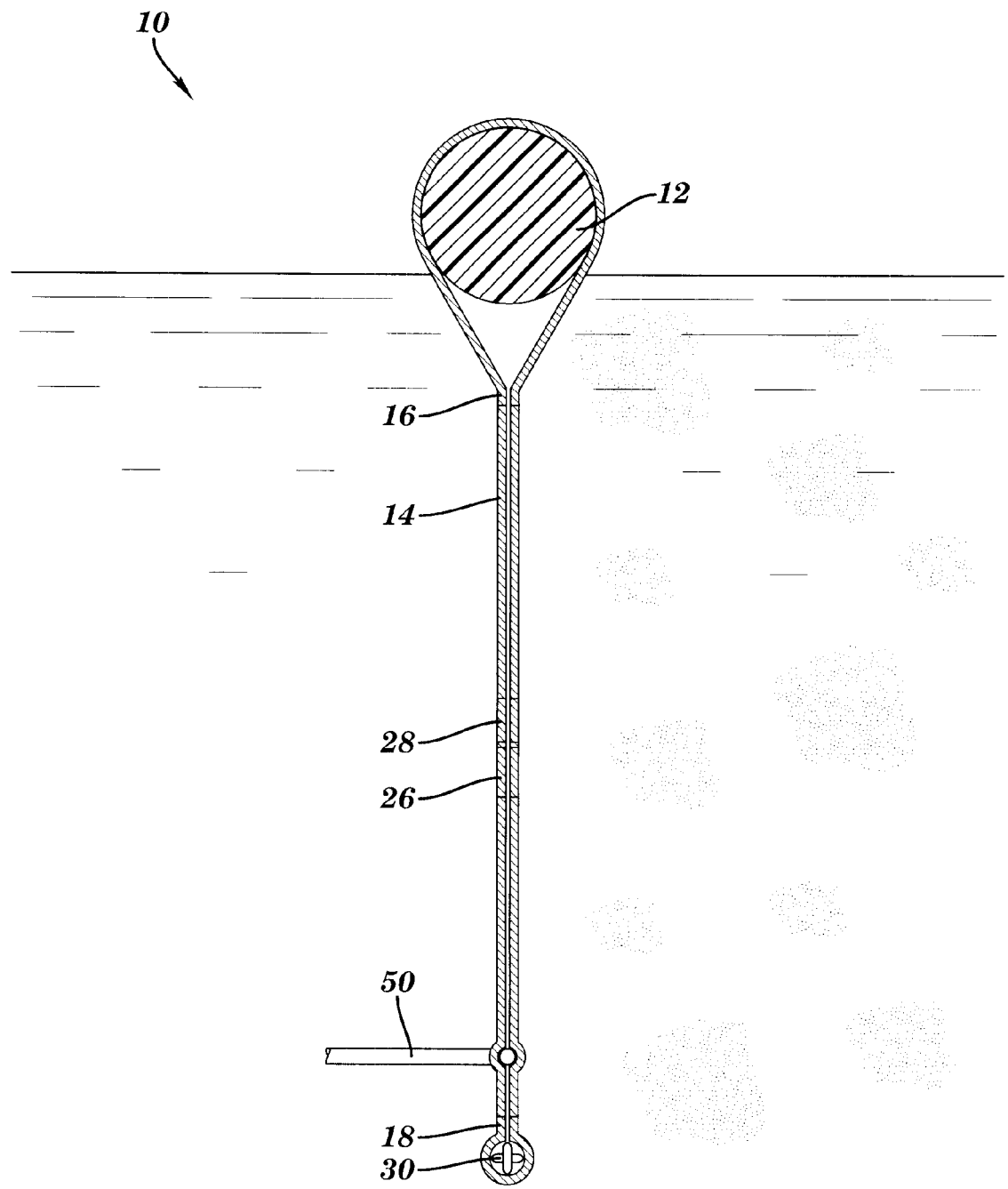
FIG. 7 is a cross-sectional view of an embodiment of the boom of the present invention.

As shown in FIGS. 7 and 8, in one embodiment the boom of the present invention also includes a gas (e.g., air) injection system utilized to clean fouling material from the curtain. When the boom of the present invention is used to control marine life from entering water intakes, water flows through the curtain in only one direction. Accordingly, it is possible for the curtain to become clogged with fouling material. It is, therefore, highly desirable to provide a means to clean the curtain. Preferably, curtain 14 contains two sheets of flexible geosynthetic fabric which are attached to each other at predetermined intervals in the vertical direction at seams 54 to form a panel 56 approximately five to eight feet wide, although larger or smaller panels could be utilized. The curtain 14 contains a plurality of panels 56. A gas injection system is installed into each panel such that compressed gas (e.g., air) is injected into each panel 56 to remove fouling material from the curtain, specifically the sheets of flexible geosynthetic fabric of each panel 56. As shown in FIG. 8, the gas injection system includes an air injector 50 which can be a rigid or flexible tube or pipe which extends between the layers of sheets of geosynthetic fabric. For example, when the curtain includes two layers of geosynthetic fabric, air injector 50 is connected to a source of compressed air (not shown) so that various duration bursts of air may be injected into and between the sheets of geosynthetic fabric which make up panel 56. Although air is preferred, any gaseous substance which will operate to clean fouling material from the sheets of flexible geosynthetic fabric can be used. Preferably, air is injected into the curtain for a period of from very short intervals to very long intervals at varying pressures. In addition, if desired, the gas injection system may include a diffuser 52. Diffuser 52 is a tube or pipe which is connected to air injector 50 and is disposed perpendicularly thereto, extending substantially the length of the panel. Diffuser 52 contains openings 58 spaced along its entire length so as to allow air to enter panel 56 uniformly to substantially remove fouling material from panel 56 (thus, curtain 14). The gas injection system may also include valves such that the duration of the compressed gas injection is controlled. The gas injection system can either be manually or automatically operated. For example, a manual valve system can be used such that a manual valve is dedicated to each panel. The valves will be opened briefly, one at time by an operator, to create the burst of air described above. Alternatively, the valves can be automated, where the valve opening process is undertaken using remotely actuated valves. An automated control system for regulation of the gas injection system would include a programmable logic control unit or processor capable of operating a compressor unit and regulating operation of a plurality of valve assemblies in response to a timing program or activation of sensors which detect, for example, the displacement of the boom in the water. The valves may be electronic, pneumatic, or hydraulic. The timing of the gas injection system operation can be dictated by the particular requirements of the application (i.e., water conditions or tidal fluctuations, etc.). Further, an override function can also be provided should the boom become clogged due to an unusual event.

Although not meaning to be bound by theory, the gas injection system cleans the fouling material from the boom curtain by the following ways. First, when air is injected between the plurality of layers of fabric, the majority of the air stays inside the sandwiched fabric and directs the air up to the top of the boom instead of dissipating away with the current. Secondly, the violent nature of the burst provides bubbles which tend to shake the fabric and substantially dislodge accumulated fouling material. The added benefit to the violent gas injection system is the physical characteristic of compressed air. For example, air injected at, for example, 30' of water depth will double in volume by the time it rises to the surface. Consequently, by the time the short air blast reaches the surface it is about double in volume, resulting in significant movement of the boom, whereby fouling material present on the curtain is substantially dislodged.

Moreover, the air that escapes through the tiny pores of the curtain fabric, in limited quantities, does two important things. The first is that it comes out as a "fizz", meaning that the air that does find its way through the fabric is turned into minute bubbles that have a tendency to attach themselves to fouling materials, such as particulates or marine life, that cling to the boom. Second, the very nature of the air escaping at depth and then expanding during its ascent causes an upwelling of water. Therefore, the combination of the small bubbles attaching to the debris and the upwelling water tends to bring the physical debris (particulates or marine life) to the surface and preclude it from immediately clogging the fabric again despite the continued draw through the curtain.

The boom of the invention can be deployed substantially throughout the full water column, i.e., from the surface to the floor of a body of water. The flotation unit may be on the water surface with a curtain extending down through the water toward the floor, or, alternatively, the flotation unit can be submerged. For example, in some applications the boom may be submerged to allow movement of vessel traffic or ice. With properly installed, ballasts and anchors, the boom can remain stationary under moving ice, thereby acting to stop pollutants from migrating from the water surface downward to the sea floor and then beyond the containment area.

In some applications it may be desirable to use a partial boom which extends either downwardly from the water surface to a position above the sea floor or from the sea floor upwardly to a position below the water surface.

The containment boom 10 may have tow cords. For example, boom 10 may have at least two tow cords 32 and 34 secured to the main sheet portion 20. The tow cords 32 and 34 are used to tow the boom into position or to tow a boom from one location to another. The two cords 32 and 34 are bands or strips of nylon lifting straps, steel or aluminum cable, polypropylene rope, geosynthetic material, or the like that extend the length of the curtain 14 and are secured to the main sheet portion 20. The tow cord 32 is secured at the first sleeve 16 or therebelow and the tow cord 34 is secured at the second sleeve 18 or thereabove. The tow cords 32 and 34 have a loop portion 36 at each end.

Depending on the overall length of the curtain 14 and other design parameters, additional tow cords may be positioned on the main sheet portion as necessary.

The vertical dimension of the curtain 14 can be increased by securing additional sheets of geosynthetic fabric together along their co-extending edges until the desired height is obtained.

Sewing or heat fusion of the geosynthetic material can be used to form the first and second sleeves 16 and 18, to connect multiple sheets together to add additional height, or to attach the tow cords 32 and 34. The geosynthetic fabric can be sewn with a conventional industrial sewing machine, and heat fusion can be accomplished with an industrial iron. Heat fusion can also be accomplished by puncturing or piercing through the overlapped geosynthetic fabric with a soldering iron.

Figure 5:
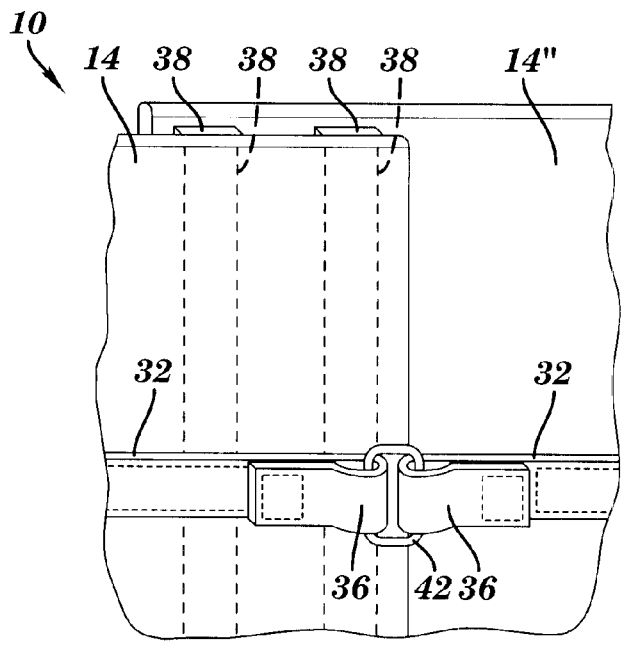
FIG. 5 is an enlarged perspective view of a coupling used to connect two boom segments of the present invention.

In addition, booms according to the present invention can be manufactured to any desired length by securing sheets of geosynthetic fabric together. A series of containment booms 14 constructed according to the present invention can be joined together to form booms of longer longitudinal length. For this purpose, curtain 14 extends longitudinally beyond the end of flotation unit 12 to define an end portion at each end of containment boom 10, as best illustrated in FIGS. 1 and 4. With this construction, two curtains can be positioned such that the end portions of two endwise adjacent curtains 14 overlap. The overlapping end portions can be sewn or heat sealed together. For quicker on-site connections, a coupler device may be used. A particularly suitable coupler device, illustrated in FIGS. 3 and 4, is a pair of industrial hook-and-loop fastening strips 38, such as the Dual-Lock Systems(polyolefin) commercially available from the Minnesota, Mining and Manufacturing Company. Mating hook-and-loop fastening strips 38 are secured to the end portions of the two endwise adjacent curtains 14 that are to be connected together, with the strips of one curtain positioned to coincide with mating strips of the other curtain. Other alternative mechanical means can be used to form the connection. The final step in joining curtains 14 is to bring tow cord loop portions 36 of one curtain together with the tow cord loop portions 36 of the other curtain and secure the tow cord loop portion 36 together using carabiniers 42, shackles, or other appropriate mechanical connecting means, such as shown in FIG. 5. Such a connection allows for uniform load distribution along the tow cords. If desired, ballast 30 can be tied to the lower tow cord 34 rather than being positioned in second sleeve 18.

FIG. 5 depicts a portion of one curtain 14 connected to another curtain 14 to form a longer containment boom 10.

Figure 9:
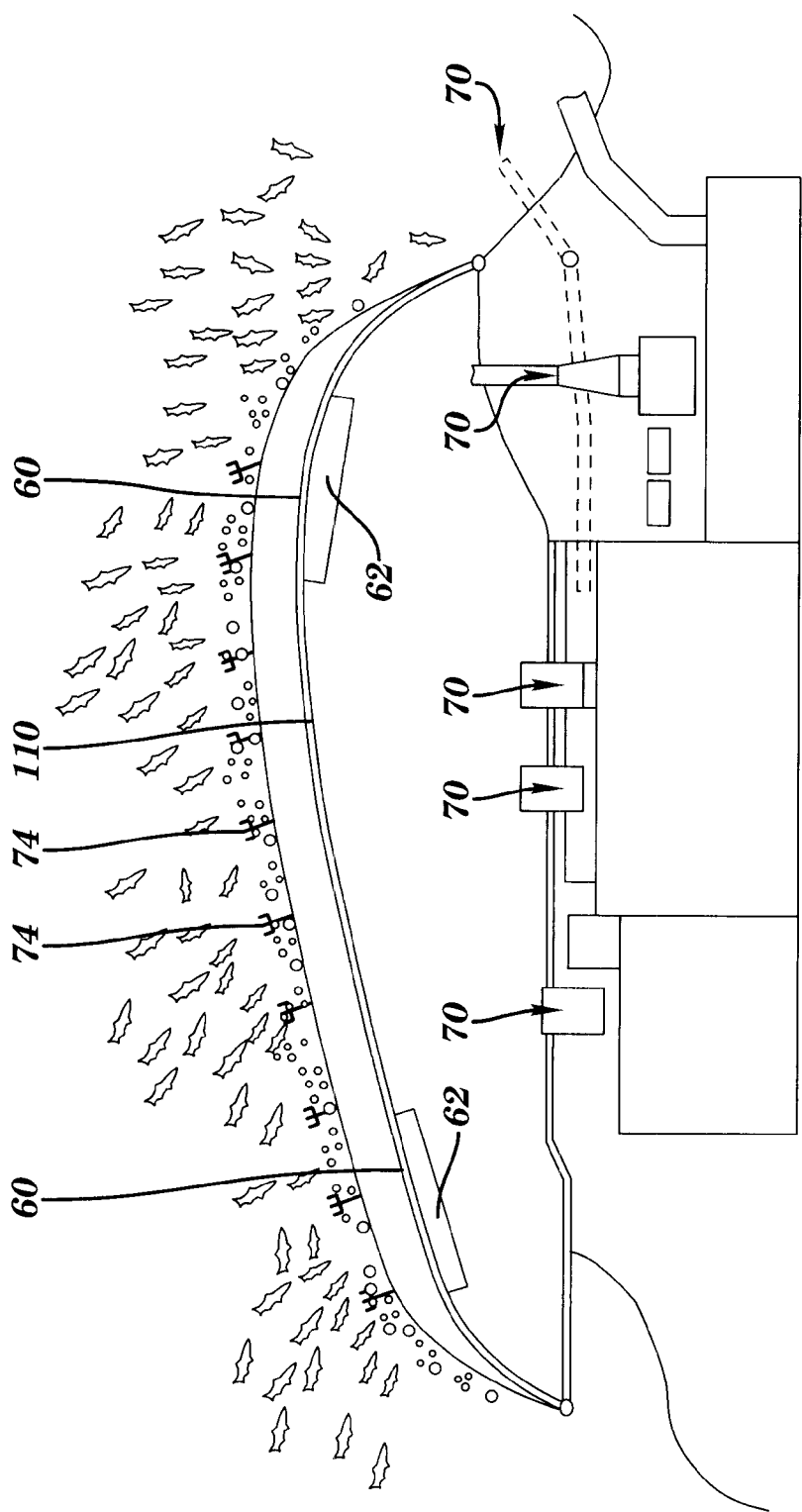
FIG. 9 is a diagram of the boom of the present invention in use.

As discussed above, when the boom of the present invention is used in an application where water passes through the boom curtain in one direction, it may become clogged with fouling material. If the boom curtain becomes sufficiently fouled such that water is unable to adequately pass through the boom curtain, the boom curtain anchoring system may be ripped from place by the force of the water. Accordingly, it may be desirable to have a safety system which allows the water to flow over the boom, at certain locations, so that the boom curtain will not be damaged or destroyed. Therefore, in another embodiment of the present invention, a boom containment system is provided in a plurality of sections and at least one of these sections is a "tidal responsive skimmer wall" 60 as shown in FIG. 9. In one form, the tidal responsive skimmer wall 60 is a section of the boom curtain that has less buoyancy, and therefore, will overtop (i.e. water will pass over the section) at a given point of load against the boom curtain. The tidal responsive skimmer wall still blocks most of the depth of the water column, but allows a measured amount of water to overtop in the event of an overload. The level of buoyancy of the section can be designed to overtop for a set amount of water, from as little as a few inches. In addition, it adjusts with the changing water elevation due to the tide and is, therefore, designated "tidal responsive" and in a sense, the boom then becomes a floating weir. In actuality, it acts as a safety valve that allows water to go over the top rather than rip the boom loose from its anchors or rip out the anchoring system. This system prevents damage to the boom in the event of total clogging. Preferably, an overflow weir 62 is provided in conjunction with each section of tidal responsive skimmer wall 60 to filter out debris, etc., that may pass over the tidal responsive skimmer wall with the water that overtops. The tidal responsive skimmer wall is a section of boom with the components as shown in FIGS. 1–6, except that floatation device 12 is less buoyant. Alternatively, the tidal responsive skimmer wall includes a curtain made of a single layer of geosynthetic fabric, as described in U.S. Pat. No. 5,102,261, which is incorporated herein by reference. Preferably, the tidal responsive skimmer wall includes a boom curtain sheet of flexible geosynthetic fabric having an upper edge, a lower edge, and a main sheet portion therebetween, and a plurality of tow ends secured to the main sheet portion, said upper edge being folded along a lengthwise fold line and secured to the main sheet portion to form a first sleeve to contain a flotation unit, and said lower edge being folded lengthwise around a ballast and secured to the main sheet portion to form a second sleeve, said first sleeve additionally including slits cut therein at regular intervals for insertion of floatation units. It is preferable to use a single layer of fabric for the tidal responsive skimmer wall.

As an alternative to the tidal responsive skimmer wall 60, a portion of the boom may be a partial depth boom. Where such a partial depth boom is used, the fabric is preferably double layer as described above.

The containment/exclusion boom of the present invention is particularly effective because the flexible nature of the curtain allows the curtain to conform to the shape of the shoreline and floor of the body of water (e.g., sea floor, river bed, etc.). This forms a sufficiently tight seal to control movement of particulates or marine life beneath or around the curtain.

Figure 14:
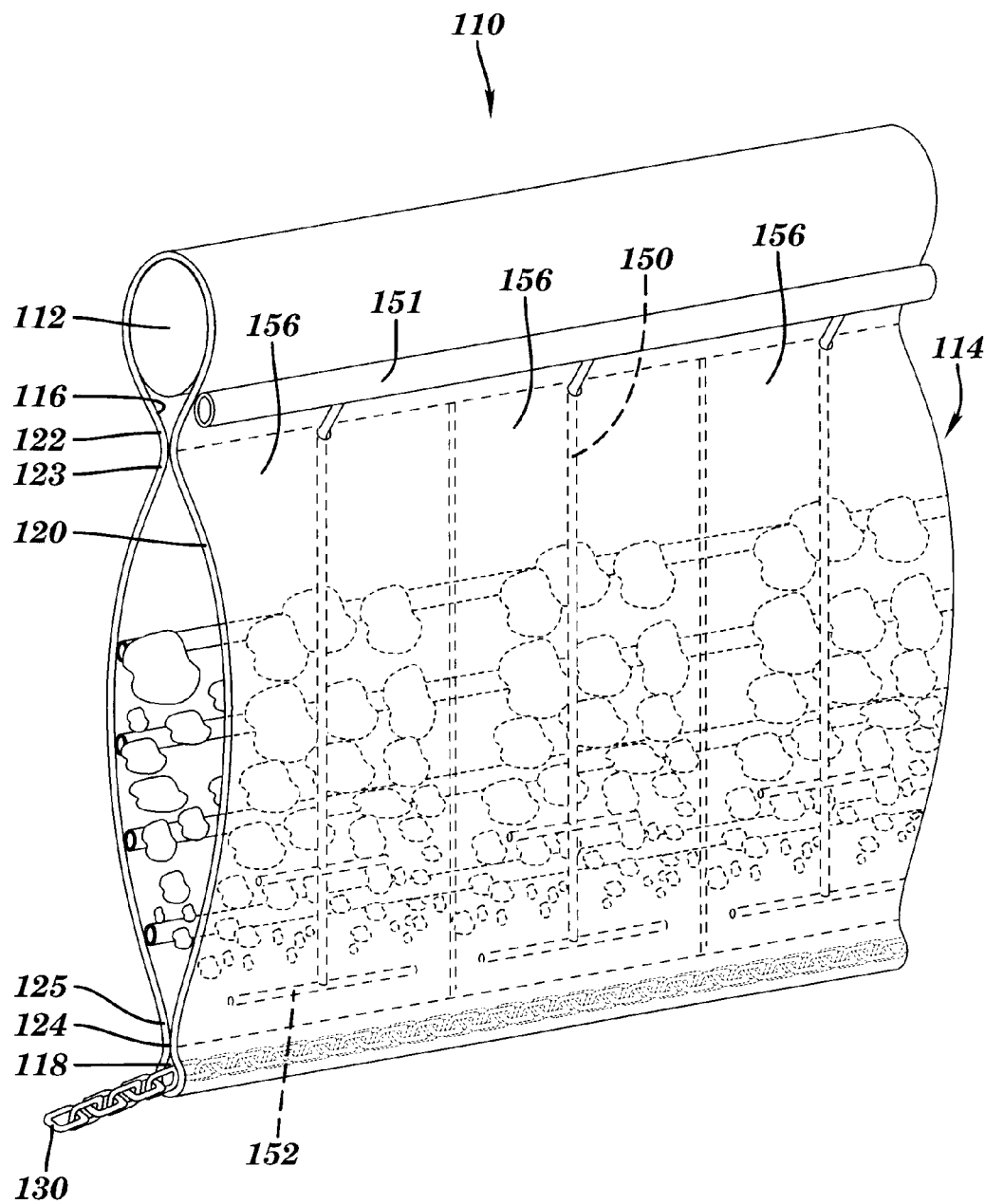
FIG. 14 is a fragmentary perspective view of a third embodiment of the boom of the present invention.
Figure 15:
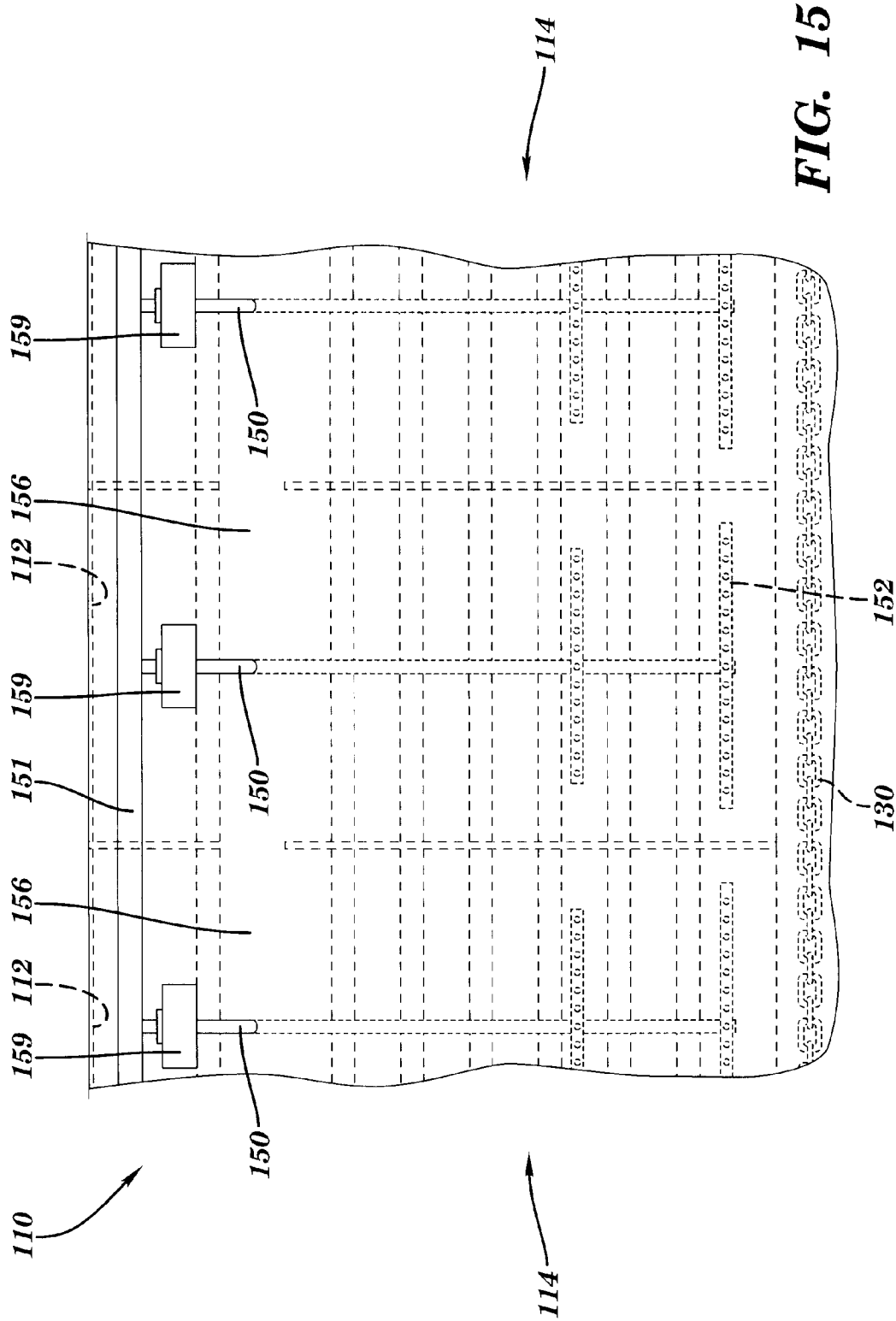
FIG. 15 is an elevational view of the boom of FIG. 14.
Figure 16:
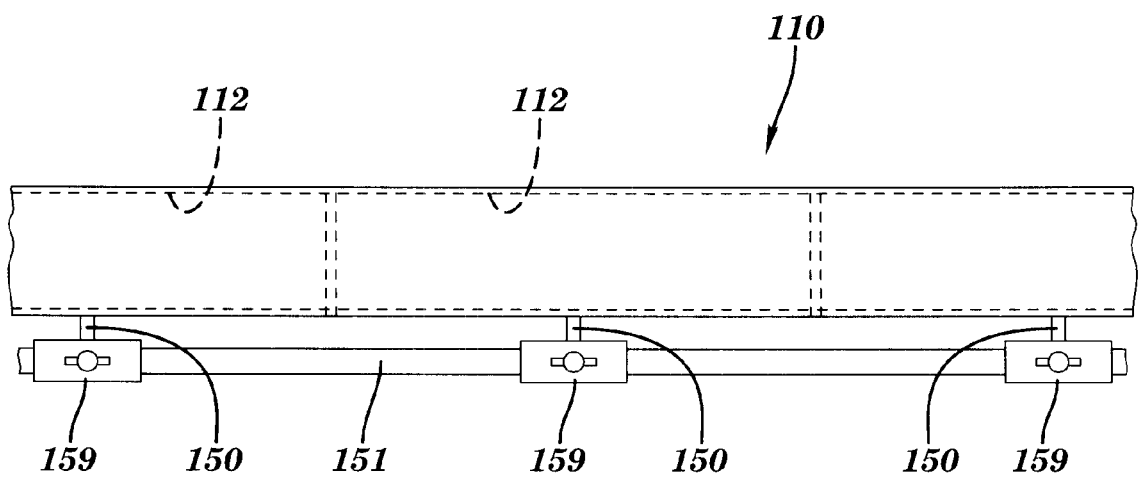
FIG. 16 is a top plan view of the boom of FIG. 14.

Yet another embodiment of the containment/exclusion boom of the present invention is shown in FIGS. 14–18. Only a segment of the boom 110 is shown and, for purposes of clarity, detailed features (e.g., tow cords, fastening strips, etc.) are not shown. It should be apparent to one skilled in the art, however, that such detailed features may readily be incorporated into the boom 110 as described above. The boom 110 includes one or more flotation units 112 and a curtain 114. Curtain 114 may be formed of a single sheet of flexible fabric (e.g., geosynthetic fabric) or a plurality of sheets of flexible fabric. As shown in FIG. 14, curtain 114 includes two sheets of geosynthetic fabric.

The first sheet has an upper first sleeve 116 and a lower second sleeve 118, with a main sheet portion 120 extending therebetween. First sleeve 116 is constructed by folding an upper first edge portion 122 of the sheet of geosynthetic fabric along a lengthwise fold line and securing upper edge portion 122 toward a lower second edge portion 124 thereof to main sheet portion 120. Flotation unit 112, which may comprise one or more blocks of buoyant material, can then be inserted as described in the preceding embodiment. Second sleeve 118 is formed by folding the lower edge portion 124 of the sheet along a lengthwise fold line and securing the lower edge portion to the main sheet portion 120. The second sleeve is adapted to receive a ballast 130. Alternatively, the second sleeve 118 may be replaced by a plurality of grommets (not shown) or the like, which are used to connect the lower edge portion 124 of curtain 114 to the ballast and/or a plurality of anchors.

The second sheet has an upper first edge portion 123 and a lower second edge portion 125, both of which are secured to the first sheet. The curtain is also provided with a number of panels 156, which are formed by securing together the first and second sheets of fabric over spaced intervals.

The boom 110 also includes a gas (e.g., air) injection system, which is preferably secured in part to the first sleeve. The gas injection system includes a source of compressed gas (e.g., an air compressor) and a conduit 151 in fluid communication with the source of compressed gas. Each panel is provided with an injector 150 in fluid communication with the conduit 151 and a valve 159 to regulate the flow of compressed gas through the injector 150 and into the panel between the first and second sheets of geosynthetic fabric. The valves 159 may be manually operable or automatically operated by a control system (not shown), as described above. Inside of each panel 156, the injector 150 may be optionally provided with a diffuser 152, which enables the gas bubbles to be substantially evenly distributed throughout the width of the panel. As described in detail above, the rising gas will clear fouling material from the curtain 114.

Figure 17:
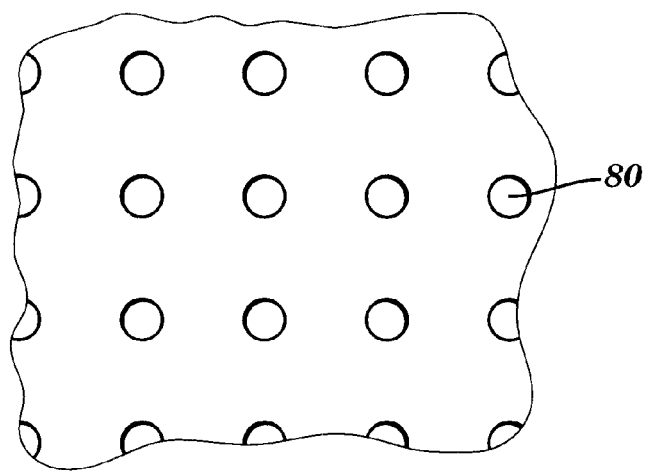
FIG. 17 is an enlarged fragmentary view of a first sheet of flexible fabric used in the curtain on the boom of FIG. 14.
Figure 18:
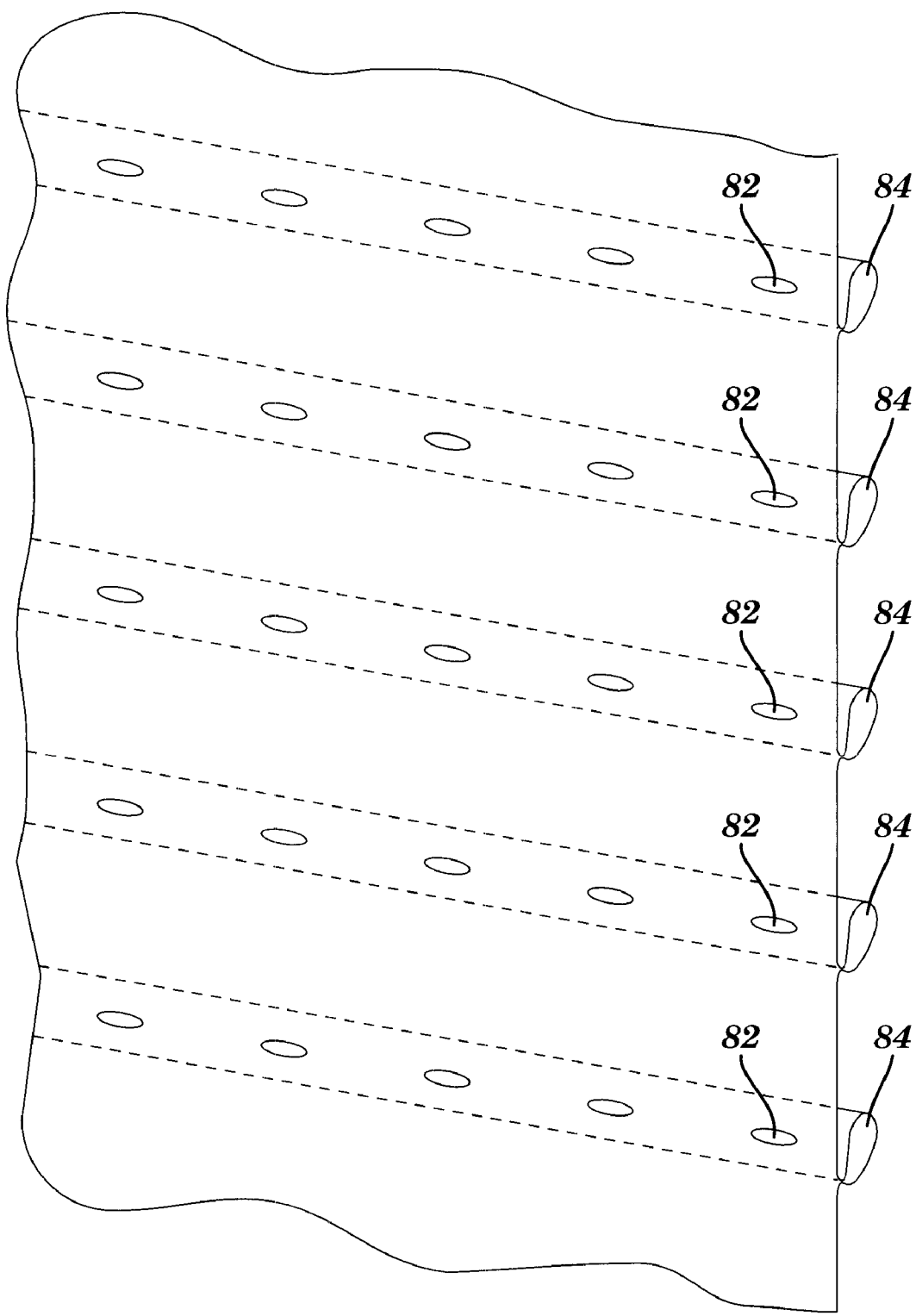
FIG. 18 is a fragmentary perspective view of a second sheet of flexible fabric used in the curtain of the boom of FIG. 14.

Boom 110 is particularly adapted for use as an exclusion system in conjunction with a water intake system. In such applications, the boom is positioned with the first sheet of fabric exposed to the suspended particulates and/or marine life. To facilitate the flow of water through the curtain 114 while suspended particulates or marine life are excluded from passing through the curtain, the first sheet of geosynthetic fabric (which is exposed to the water current) is provided with a plurality of perforations 80, as shown in FIG. 17. The perforations may be spaced and sized according to the particular demands of a given application, e.g., the size of materials to be excluded and the flow rates required for the water intake system. To reduce the stress placed upon the curtain 114, the second sheet of fabric allows greater water flow. The second sheet is provided with at least one arrangement of openings 82, preferably a plurality of vertically spaced, horizontal arrangements of openings 82 which are formed through the sheet. The openings 82 in the second sheet are substantially larger than the perforations 80 of the first sheet, thereby allowing greater water flow through the second sheet. To prevent the compressed gas from escaping through the openings 82 of each panel, the second sheet is also provided with a valve flap 84 secured to the side of the second sheet facing the first sheet and located below each arrangement of openings. Although each arrangement of opening 82 is provided with a single valve flap 84, it should be apparent that each opening could itself be provided with a single valve flap. As shown, the valve flap may be formed by folding the second sheet and securing the flap in position, such as by heat sealing, stitching, or the like. When gas is released in each panel, the rising gas lifts the valve flap 84 to obstruct the openings 82 and allow the gas to continuing rising upwardly toward the surface of the water.

Figure 20:
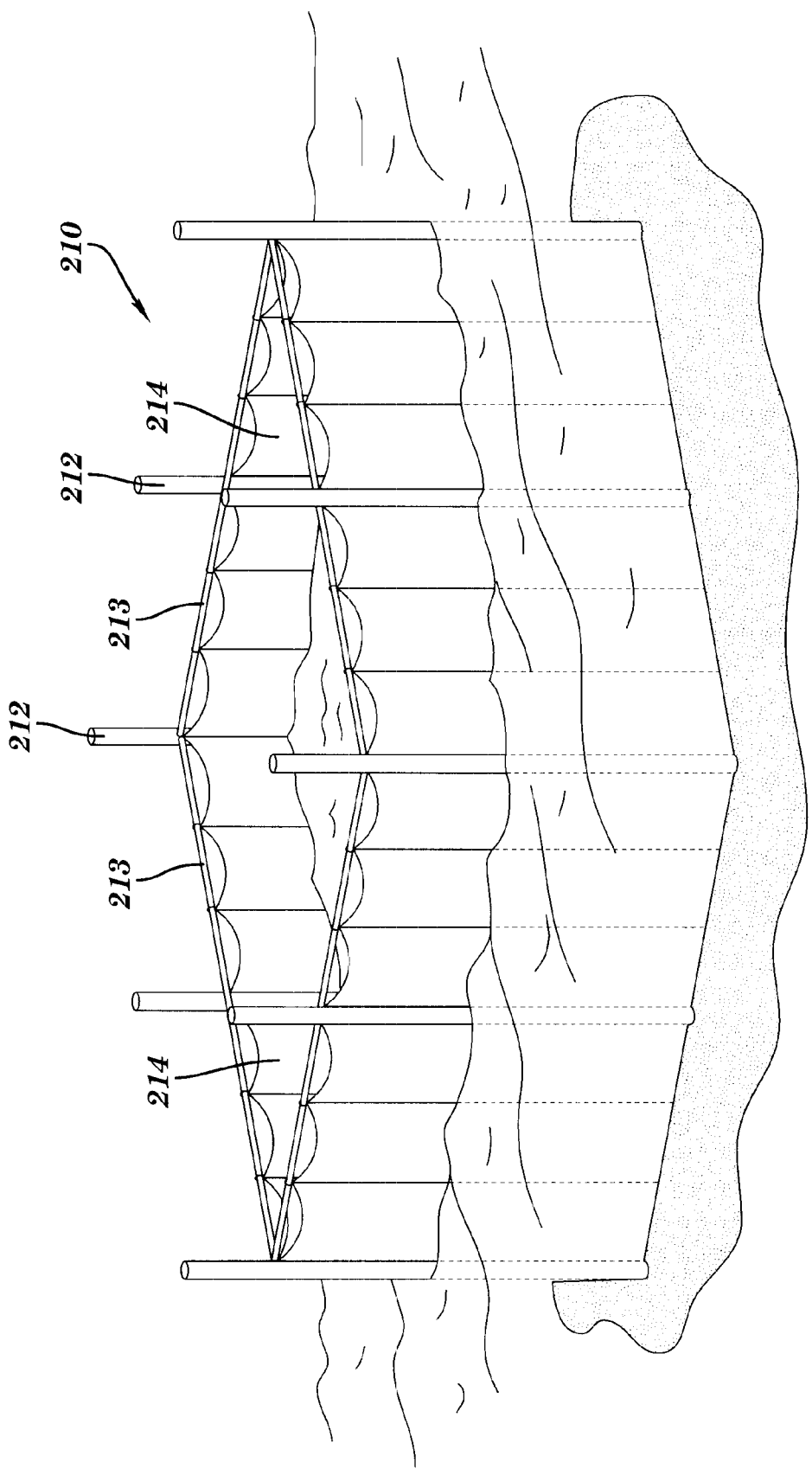
FIG. 20 is an environmental view of a fifth embodiment of the boom of the present invention.

Another embodiment of the present invention is shown at FIG. 20. In containment/exclusion boom 210, the support system is a plurality of vertical pilings 212 and horizontal support members 213 secured to and extending between adjacent pilings 212. The plurality of vertical pilings 212, which in part replace the floating units of other embodiments, can either be temporarily or permanently installed on the floor of the body of water. The pilings 212 are of conventional construction suitable to tolerate conditions required for the intended application. The horizontal support members 213 may be a wire, beam, catwalk, or other like support. Alternatively, if the pilings 212 are close enough together, then horizontal support members 213 may be eliminated entirely. The curtain 214 employed in this embodiment may be formed of a first and second sheet of geosynthetic fabric, as described for curtain 114; however, the first sheet of fabric may be formed with its upper edge portion having plurality of grommets or the like (of the type shown in FIG. 6) rather than a first sleeve. Such grommets or the like enable the curtain 214 to be hung from the horizontal support members 213 and pilings 212. The bottom of the curtain 214 can be secured using ballast or anchors as described above.

Figure 19:
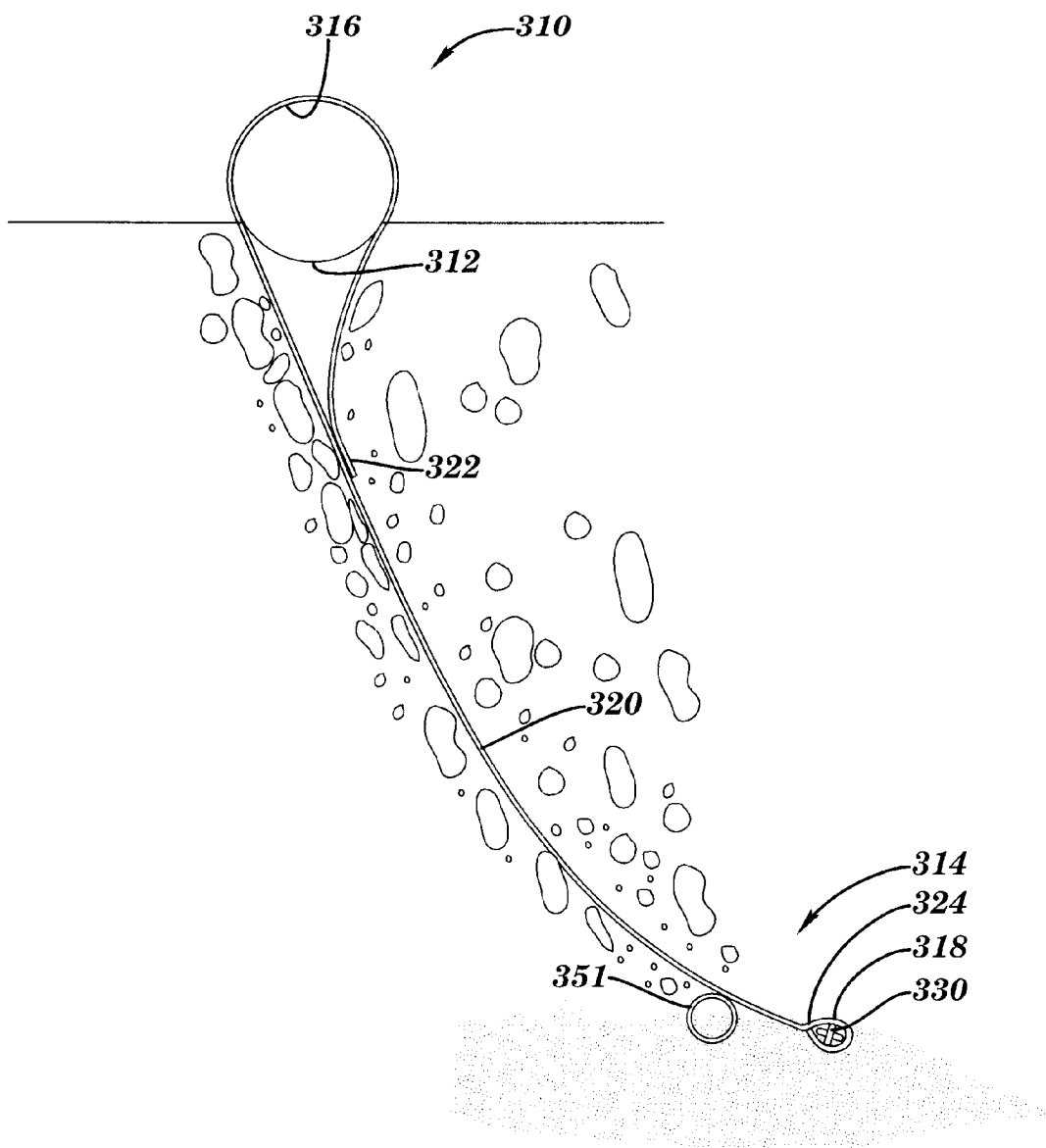
FIG. 19 is an environmental cross-sectional view of a fourth embodiment of the boom of the present invention.

Still another embodiment of the present invention is shown in FIG. 19. The containment/exclusion boom 310 includes one or more flotation units 312 and a curtain 314. Curtain 314 is formed of a single sheet of flexible fabric (e.g., geosynthetic fabric). The sheet has an upper first sleeve 316 and a lower second sleeve 318, with a main sheet portion 320 extending therebetween. First sleeve 316 is constructed by folding an upper first edge portion 322 of the sheet of geosynthetic fabric along a lengthwise fold line and securing upper edge portion 322 toward a lower second edge portion 324 thereof to main sheet portion 320. Flotation unit 312, which may comprise one or more blocks of buoyant material, can then be inserted as described in preceding embodiments. Second sleeve 318 is formed by folding the lower edge portion 324 of the sheet along a lengthwise fold line and securing the lower edge portion to the main sheet portion 320. The second sleeve is adapted to receive a ballast 330. Alternatively, the second sleeve 318 may be replaced by a plurality of grommets (of the type shown in FIG. 6) or the like, which are used to connect the lower edge portion 324 of curtain 314 to a plurality of anchors.

In use, the boom 310 is positioned such that the curtain is sloped at least about 10 degrees, preferably between about 10–45 degrees, more preferably between about 15–35 degrees. The boom is also provided with a gas injection system which includes a source of compressed gas (not shown) and a conduit 351, in fluid communication with the source, for delivering compressed gas into the water. The conduit is connected to the sheet of flexible fabric such that the conduit is located beneath the sloped sheet. The gas injection system, like those described above, may contain a diffuser in fluid communication with the conduit for dispersing the compressed gas evenly along the length of the curtain. As compressed gas is released from the conduit, the gas rises along the entire width and height of the 314 curtain, causing fouling material substantially to be removed from the upward facing side of the curtain 314 in much the same way as previously described.

The containment/exclusion booms of the present invention can be deployed or installed from a barge, a dock with a small boat, or other surface or access point near the water. Where the boom requires temporary or permanent pilings as its support structure, following piling installation the curtain can be deployed or installed from a barge, small boat, or from the horizontal support members, if available. The invention is uncomplicated in design and can be easily deployed by persons having basic water-front experience without prior training in containment boom deployment.

Depending upon the environmental, tidal, wave and current conditions, anticipated load requirements, and other parameters, the appropriate fabric, tow cord, ballast, and flotation unit can be selected to meet the specific design requirements for a given spill event or other containment/ exclusion project.

Other relevant parameters for the containment/exclusion booms of the present invention include, but are not limited to, water depth, particulate or marine life size, length of time the boom is to be in place, composition of particulates or marine life to be contained/excluded, other types of pollutants, and the availability of manpower and equipment.

Figure 10:
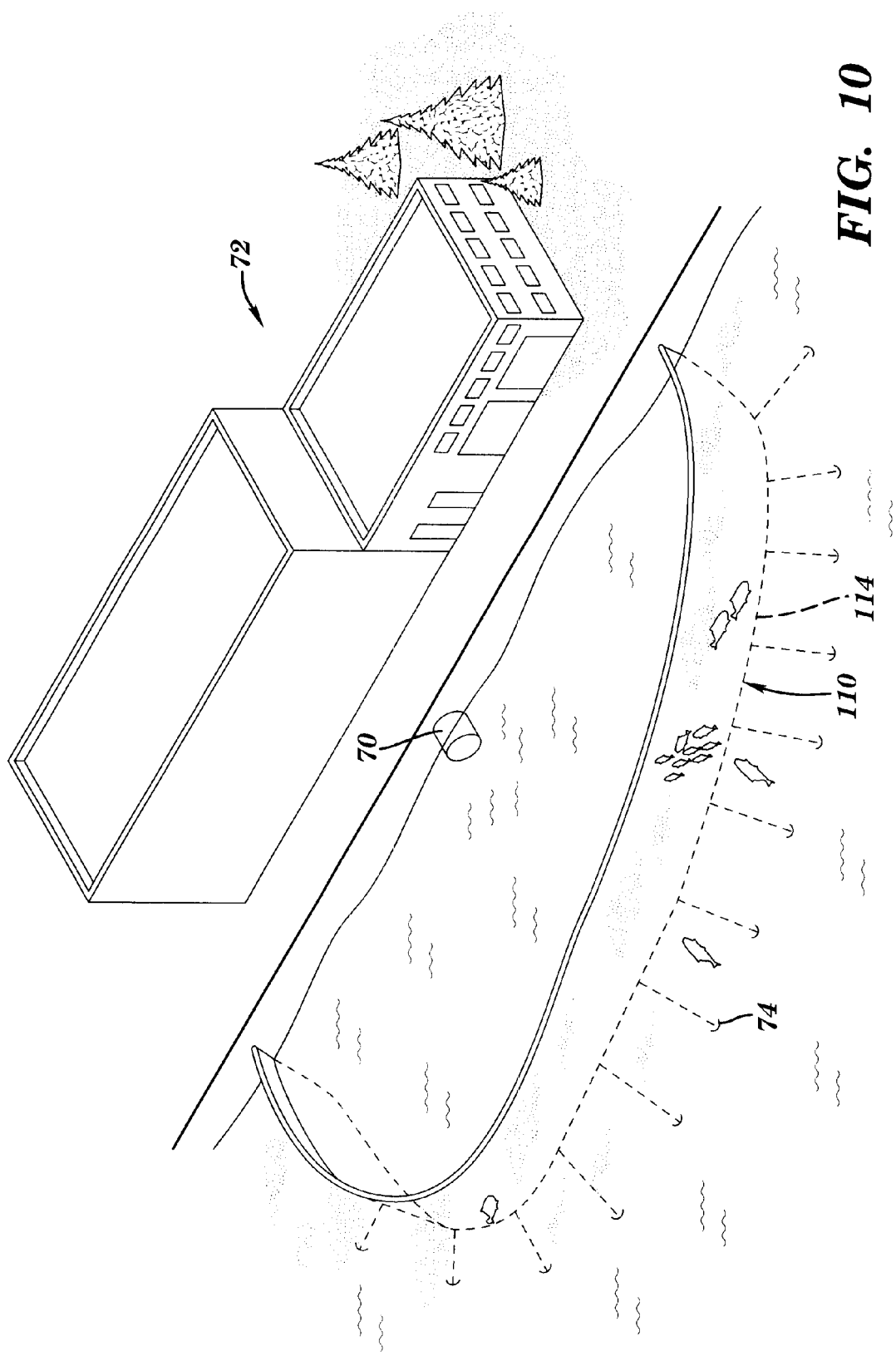
FIG. 10 is an environmental view of a boom of the present invention installed in a body of water near a water intake structure of a plant or facility.

In use, for example, as shown in FIGS. 9 and 10, a containment/exclusion boom of the present invention is placed around an intake structure 70 or structures of, for example, a power plant 72. In applications for controlling entry of suspended particulates or marine life into a water intake structure, any containment/exclusion boom of the present invention may be employed. A preferred boom for use in exclusion systems associated with water intake structures is boom 110. The overall dimension (vertical depth multiplied by longitudinal length) of the boom is designed so that a required volume of water passes through the boom. The volume of water is variable and subject to the particulars of each application. Boom 110 operates to minimize or prevent suspended particulates or marine life from entering the intake structures 70 of plant 72. A gas injection system is provided to inject gas (e.g., air) between the sheets of fabric of each panel 156 substantially to dislodge fouling material from the curtain 114. To clean the curtain, the gas is injected into each panel 156 via injector 150 and, optionally, diffuser 152 to dislodge the fouling material from the curtain 114. Boom 110 is held in place by a plurality of anchors 74. In the event the gas injection system fails for any reason, boom 110 is provided with a skimmer wall 60 and overflow weir 62 as described above and shown in FIG. 9. Alternatively, a partial depth boom can be utilized. Both of these prevent boom 110, upon total fouling of the curtain 114, from being ripped out of its anchoring system. Although shown, such skimmer walls may not be needed.

Another aspect of the present invention is to utilize a containment/exclusion boom of the present invention to provide a containment area for raising certain forms of aquatic life (i.e., a fish farm). Traditional fish farming methods, including hatcheries and fish pens (either fixed or floating), all typically rely on the immediately adjacent waters for their support environment. For a variety of reasons, such support environments may contain pollutants, bacteria, algae, harmful organisms and other harmful contaminants such as silt and organic particulate matter, among others. Since aquaculture facilities are typically stationary, the process of excluding these potentially harmful particulates or marine life become important for health and economic reasons.

Figure 21:
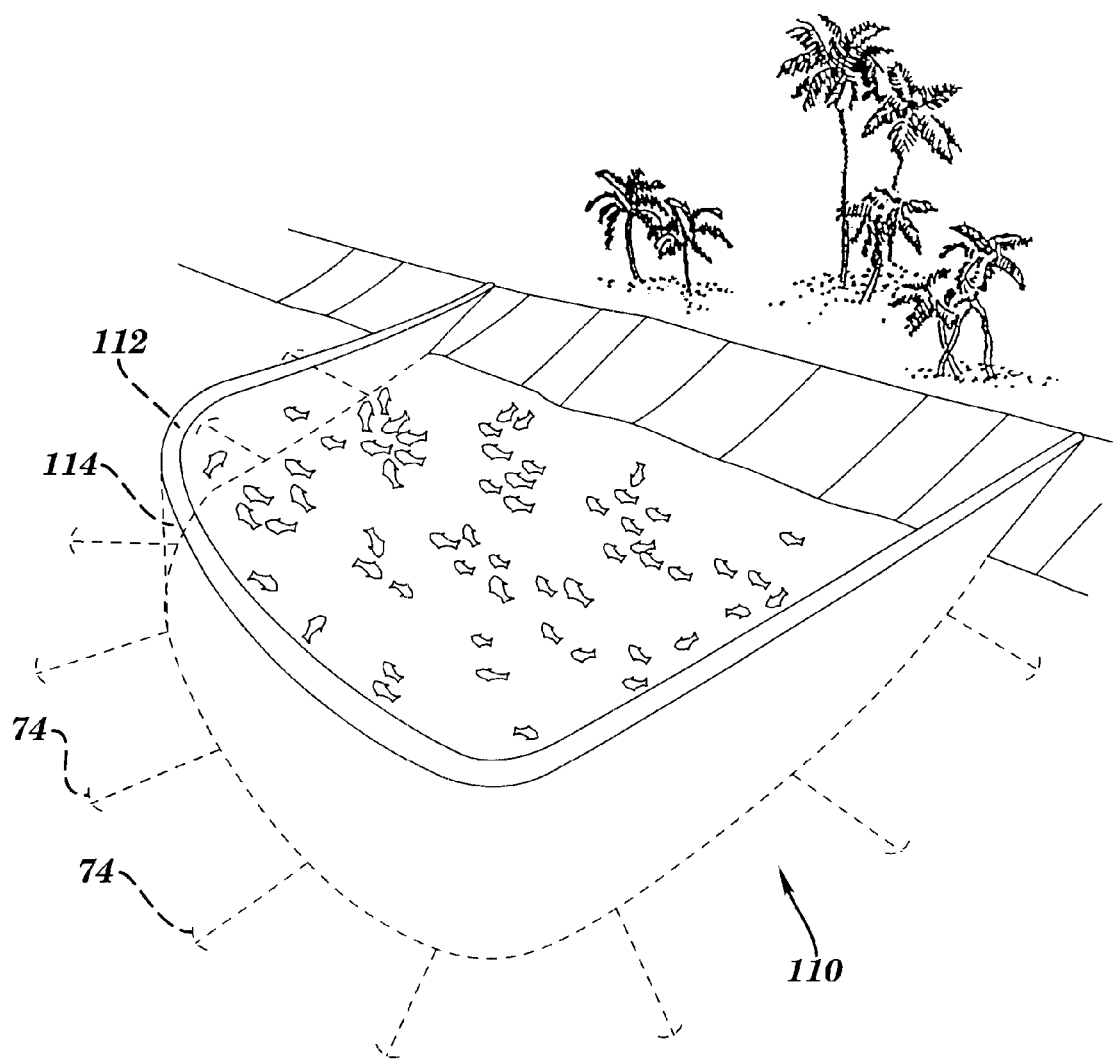
FIG. 21 is an environmental view of a boom of the present invention installed to create an open water aquaculture environment.

As shown in FIG. 21, the containment/exclusion area is located along a shore; however, an open water containment/ exclusion area is also easily formed using the boom of the present invention. The boom 110 includes one or more flotation units 112 which suspend the curtain 114 in the water, and the boom is anchored in place by anchors 74. Depending upon the environment in which the containment/ exclusion boom is placed, the curtain may contain one sheet of flexible fabric or a plurality of sheets of flexible material. The filtering capability of the curtain may be adjusted to the particular needs of the fish being raised and the particulates and marine life being excluded. For example, a fabric capable of excluding matter in the range of 30–100 microns should be sufficient in most applications. Most harmful bacteria, because it is believed to be carried on particulate matter, will be excluded from the containment area.

Still another aspect of the present invention is the use of a containment/exclusion boom of the present invention to provide a containment area around an underwater detonation site. Underwater explosives and demolition work produce sound/shock waves that travel in all directions from the detonation site at a rate of approximately four times the speed it would travel in air. Water is also non-compressible, whereas air is compressible. Thus, water more effectively transmits the energy of the shock wave to the surrounding environments. As a result, underwater explosions quite often lead to severe injury or death of large numbers of marine life as a result of the crushing effect the shock waves have on internal air cavities of the marine life. Generally speaking, regulatory agencies require some means for minimizing the impact of underwater detonations.

Figure 22:
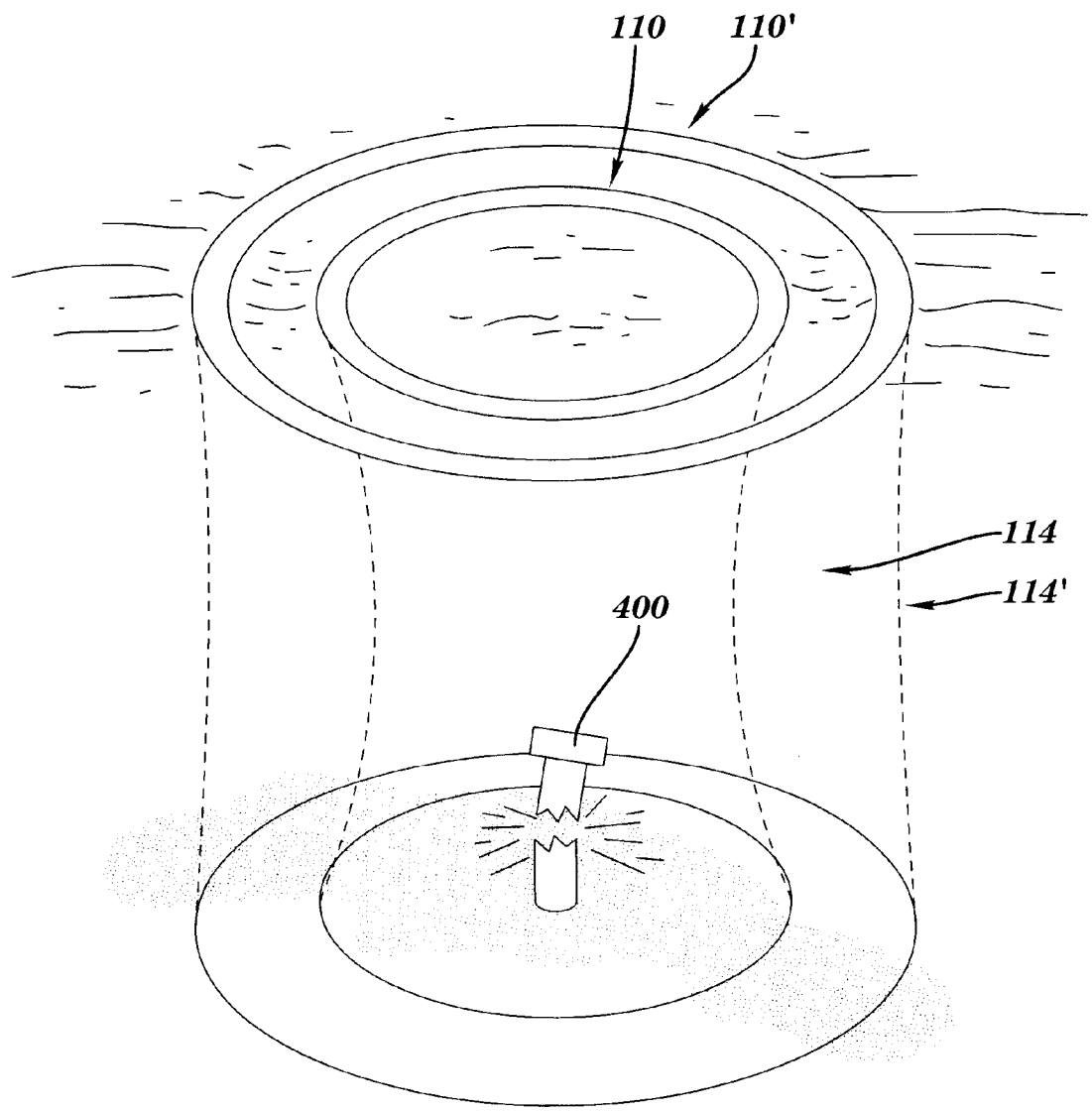
FIG. 22 is an environmental view of a pair of booms of the present invention installed around a detonation site to reduce the magnitude of the shock wave resulting from an underwater explosion.

Depending upon the size of the detonation and the strength of the resulting shock wave, one or more containment/exclusion booms of the present invention may be necessary. As shown in FIG. 22, a detonation site 400 is surrounded by a first containment/exclusion boom 110 of the present invention and a second containment boom 110' of the present invention. Each boom includes a curtain 114, 114' formed of a plurality, preferably two, sheets of flexible fabric and a gas injection system which injects compressed gas into the water between the plurality of sheets. Prior to detonation of an underwater explosive material, the gas injection system of each boom is operated to fill the curtain with a column of gas bubbles. After detonation, the shock wave contacts the curtain of the first boom which, because it is filled with the column of gas bubbles, absorbs a significant amount of the energy from the shock wave. Residual energy of the shock wave is transmitted through the curtain of the first boom, from where it passes through the water until it contacts the curtain of the second boom. As before, because the curtain of the second boom is filled with a column of gas bubbles, a significant amount of the energy of the transmitted shock wave is absorbed. The curtain of the second boom also transmits some energy of the shock wave; however, the strength or energy level of the shock wave is significantly reduced such that killing of marine life is minimized.

Accordingly, this application also relates to a method of reducing transmission of energy of a shock wave produced by an underwater explosion. The method includes introducing into a body of water a first boom system having a curtain with two sheets of flexible fabric, such that the first boom system substantially surrounds a detonation site. The method also includes injecting a gas between the two sheets of flexible fabric of the curtain, before detonation of an explosive at the detonation site, in a manner effective to reduce the transmission of energy of a shock wave resulting from detonation of the underwater explosive. The method may also include introducing into the body of water a second boom system having a curtain with two sheets of flexible fabric, such that the second boom system substantially surrounds the first boom system. When a second boom system is employed, the step of injecting involves injecting gas between the two sheets of flexible fabric of the first and second boom systems.

EXAMPLES

The following examples are provided to illustrate embodiments of the present invention but are by no means intended to limit its scope.

Example 1

Fabric Permitivity

The purpose of this example was to (1) determine the hydraulic design criteria for Gunderboom fabrics, including fabric permitivity, and rate of clogging (as measured by decreasing fabric permitivity with time) at conditions simulating the T, and (2) evaluate an innovative new method for cleaning the boom using compressed air. This large-scale flow testing was conducted at the PND research park in Anchorage, Ak.

Test Procedure

Fabric samples were secured to flanges inside a 7-feet-diameter, by 15-feet-tall testing tank, and the tank filled with tap water to a depth of approximately 10 feet. Fabrics tested included (1) two layers of 8.6-oz. non-woven geotextile, (2) one layer of woven monofilament geotextile with one layer of 8.6-oz. non-woven, (3) two layers of 4.8-oz. non-woven geotextile, and (4) one layer of woven monofilament geotextile with one layer of 4.8-oz. non-woven. A 1500-gpm capacity pump (Gorman Rupp, Model CE6A60-F4L-A) was used to circulate flow through the tank, and an ultrasonic flow meter (Panametrics Ultrasonic Flowmeter, Model 6068) was used to measure flow. Water level measurements were made in each side of the tank (on either side of the fabric sample) to the nearest 0.005 ft.

Fabric Permitivity Testing

At the beginning of each test, head differentials across the fabric over a range of flow rates were measured to determine initial fabric permitivity. After the initial permitivity of the fabric was determined, the pump was turned off, and silt was added to the pump-inlet side of the tank to bring the total suspended solids ("TSS") concentration up to 50 mg/L (equivalent to parts per million, or "ppm"). A TSS concentration of 50 mg/L was used because this is approximately the concentration found in the Hudson River, at the ORU Lovett Plant. The silt for the experiments was obtained from the Anchorage tidal flats, near Ship Creek, and tested for moisture content prior to its use. After adding the silt to half the tank, a secchi disk was used to measure visibility through the 50 mg/L water, for use in adjusting water TSS concentrations later during the experiment. It was found that a secchi disk visibility depth of 1.4 feet corresponded to a concentration of 50 mg/L. Once this depth was determined, the pump was turned on and the silty water was circulated through the pump, into the pump-outlet side of the tank, and then through the fabric sample. Additional silt was periodically added to the tank to maintain the TSS concentration at approximately 50 mg/L. The silt was always added to the pump-inlet side of the tank so that it would be cycled through the pump, and thoroughly mixed in the tank before flowing through the fabric sample.

Silt-laden water, at 50 mg/L, was filtered through the fabric at a constant rate of 10–12 gallons per minute, per square foot of fabric ($gpm/ft^2$). This rate was based on the design flow rate for the Lovett Plant installation of 11.25 $gpm/ft^2$ (equal to 270,000 gpm per 24,000 $ft^2$ of Gunderboom). The silty water flow was maintained for several hours in each experiment, and head differentials across the fabric were measured at regular intervals to determine fabric permitivity as a function of time, volume filtered, and fabric silt content.

Fabric Cleaning

After the head differential necessary to maintain the design flow rate through the fabric sample exceeded 2 inches, permitivity testing was halted, and tests to evaluate the use of compressed air for cleaning the filter were conducted. In this phase of the test, compressed air was blown into the space between the two fabric layers. The air was blown down a metal pipe to the bottom of the fabric, and in successive tests were allowed to (1) discharge directly from the end of the feed pipe, (2) discharge through a tee diffuser, and (3) discharge through a wye at the end of the feed pipe.

Results and Discussion

Figure 11:
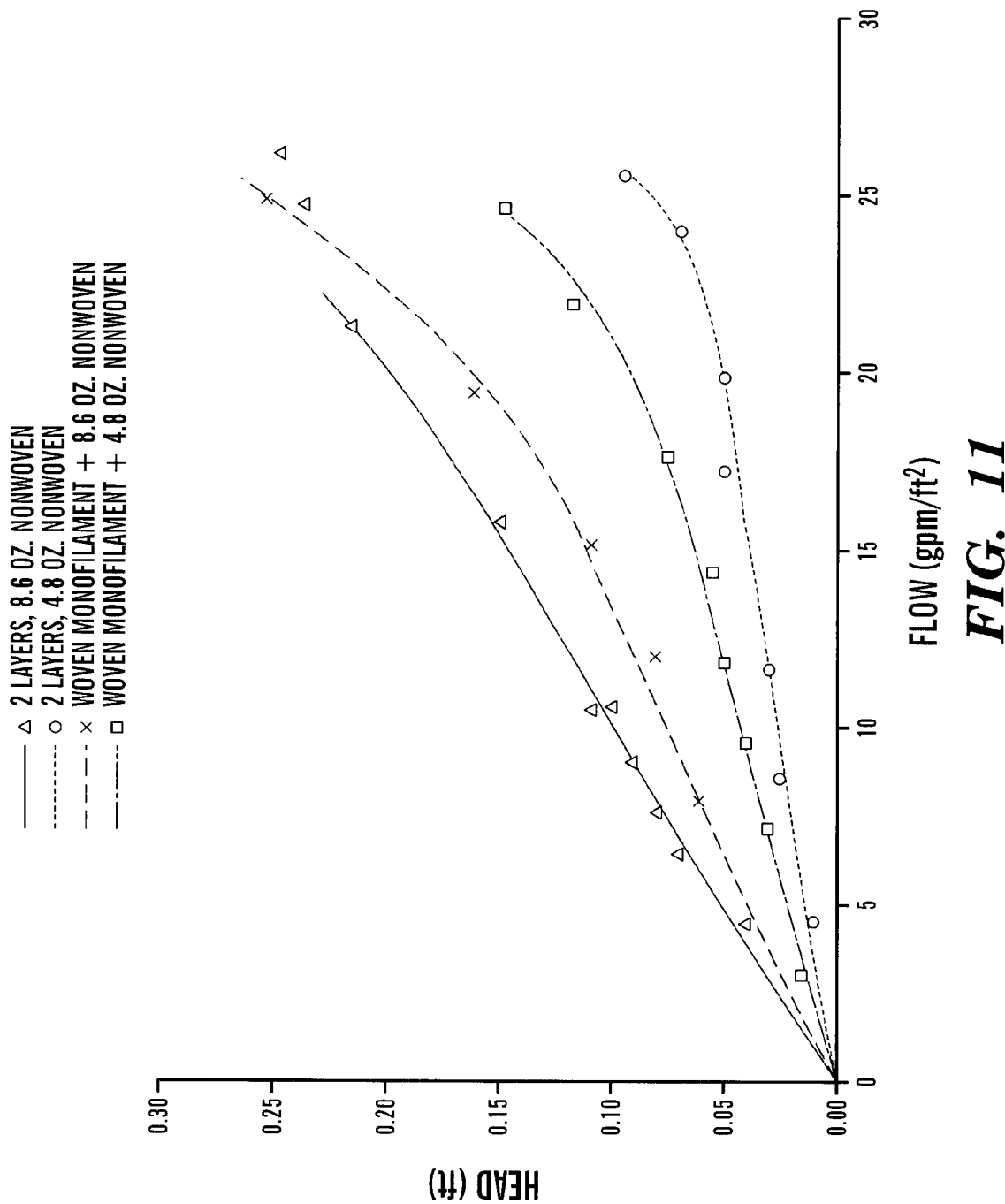
FIG. 11 is a chart showing the fabric permitivities of various materials utilized in the boom of the present invention.
Figure 12:
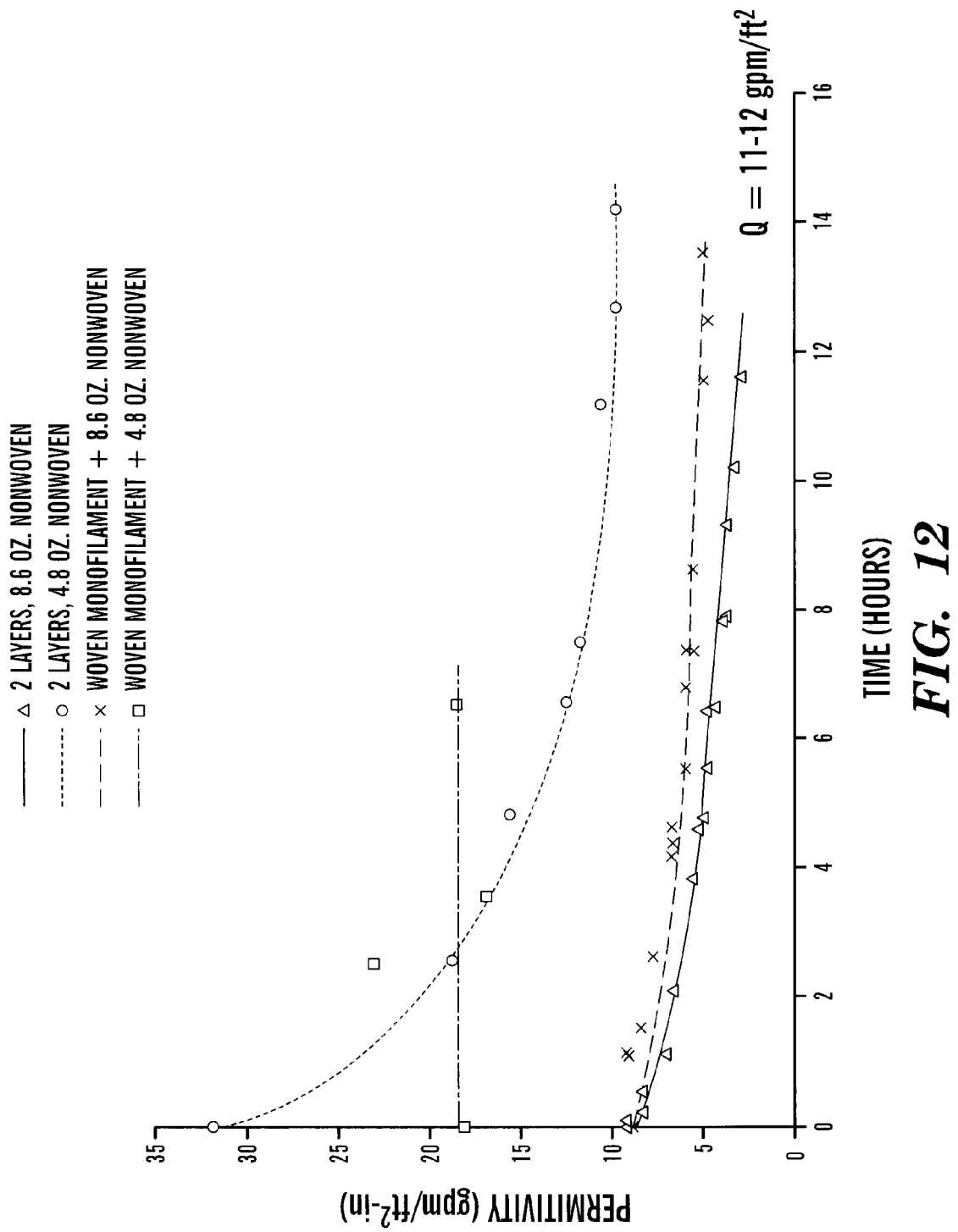
FIG. 12 is a chart showing the fabric permitivities of various materials utilized in the boom of the present invention after filtration of water containing 50 mg/L suspended silt.
Figure 13A:
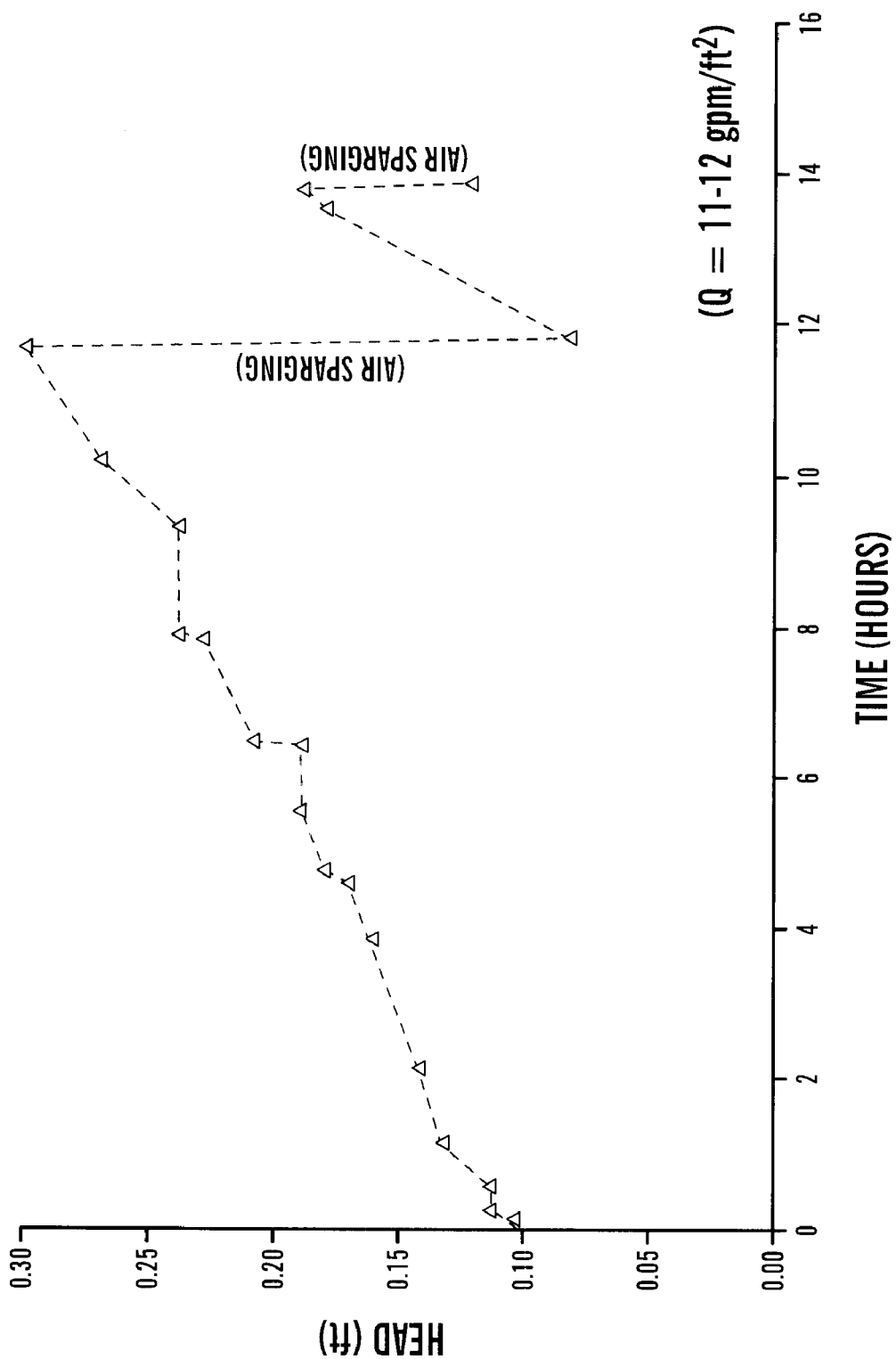
FIGS. 13A–D are charts showing cleaning by air sparging of various materials of the boom of the present invention.
Figure 13B:
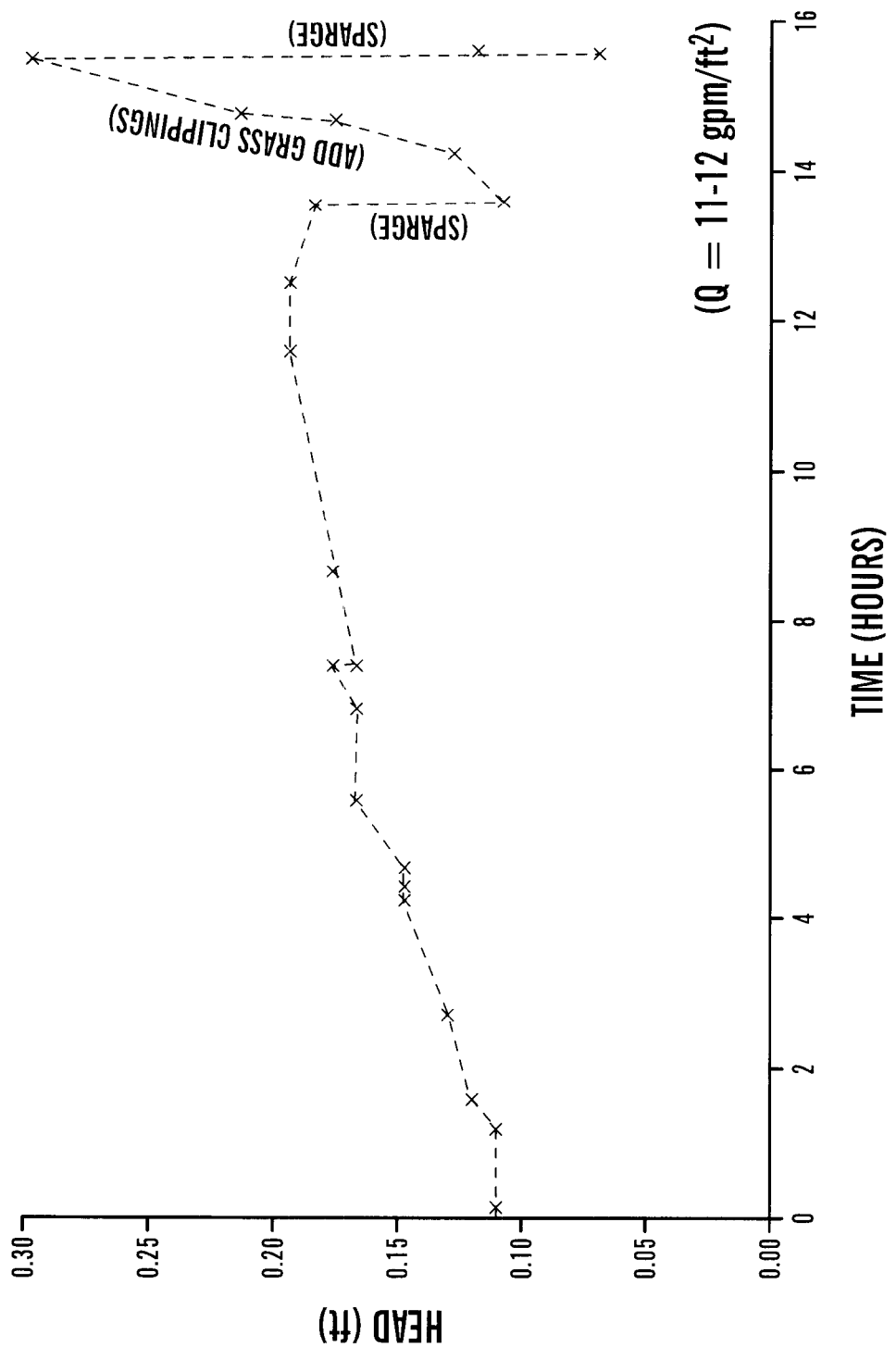
Figure 13C:
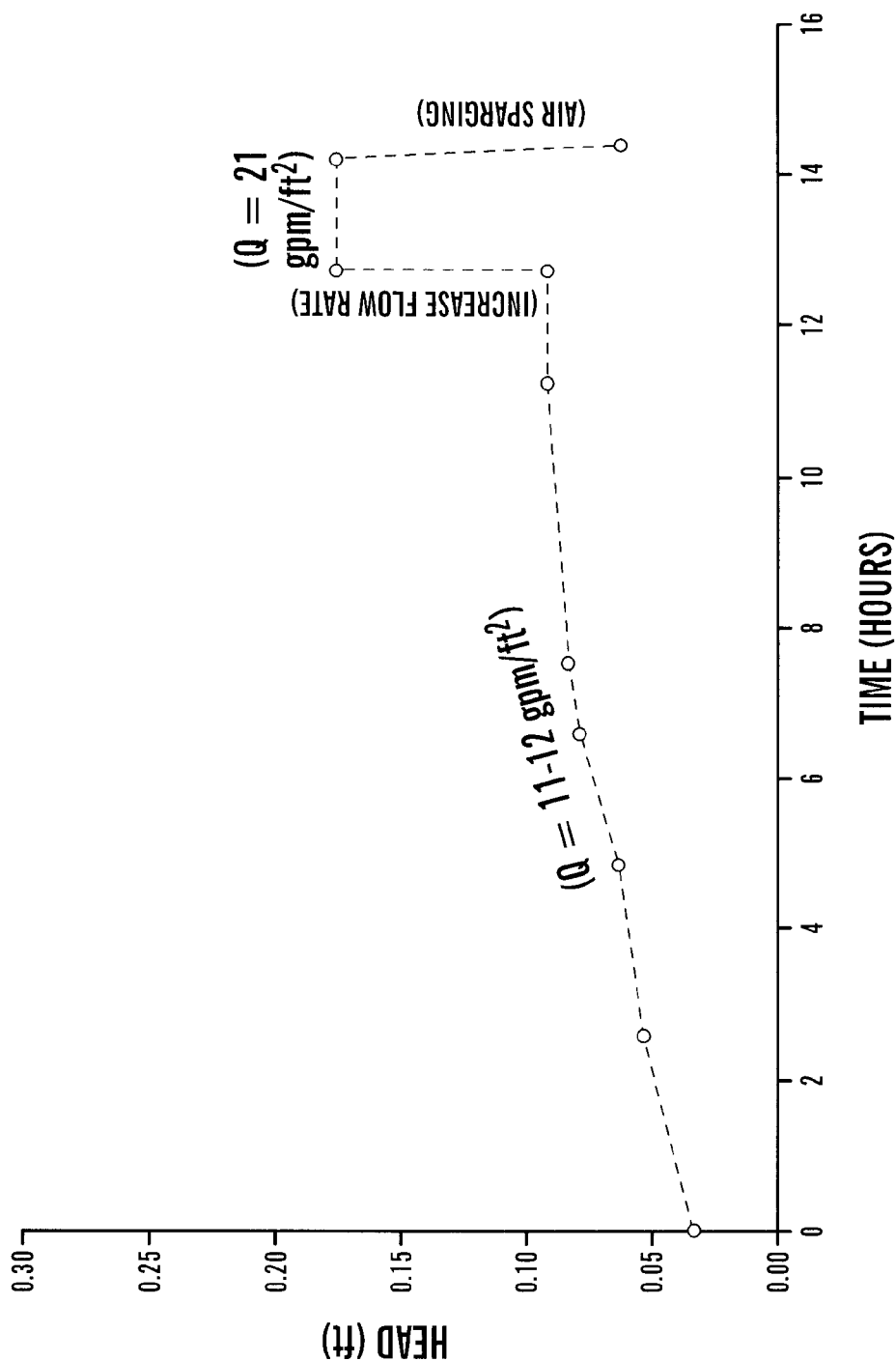
Figure 13D:
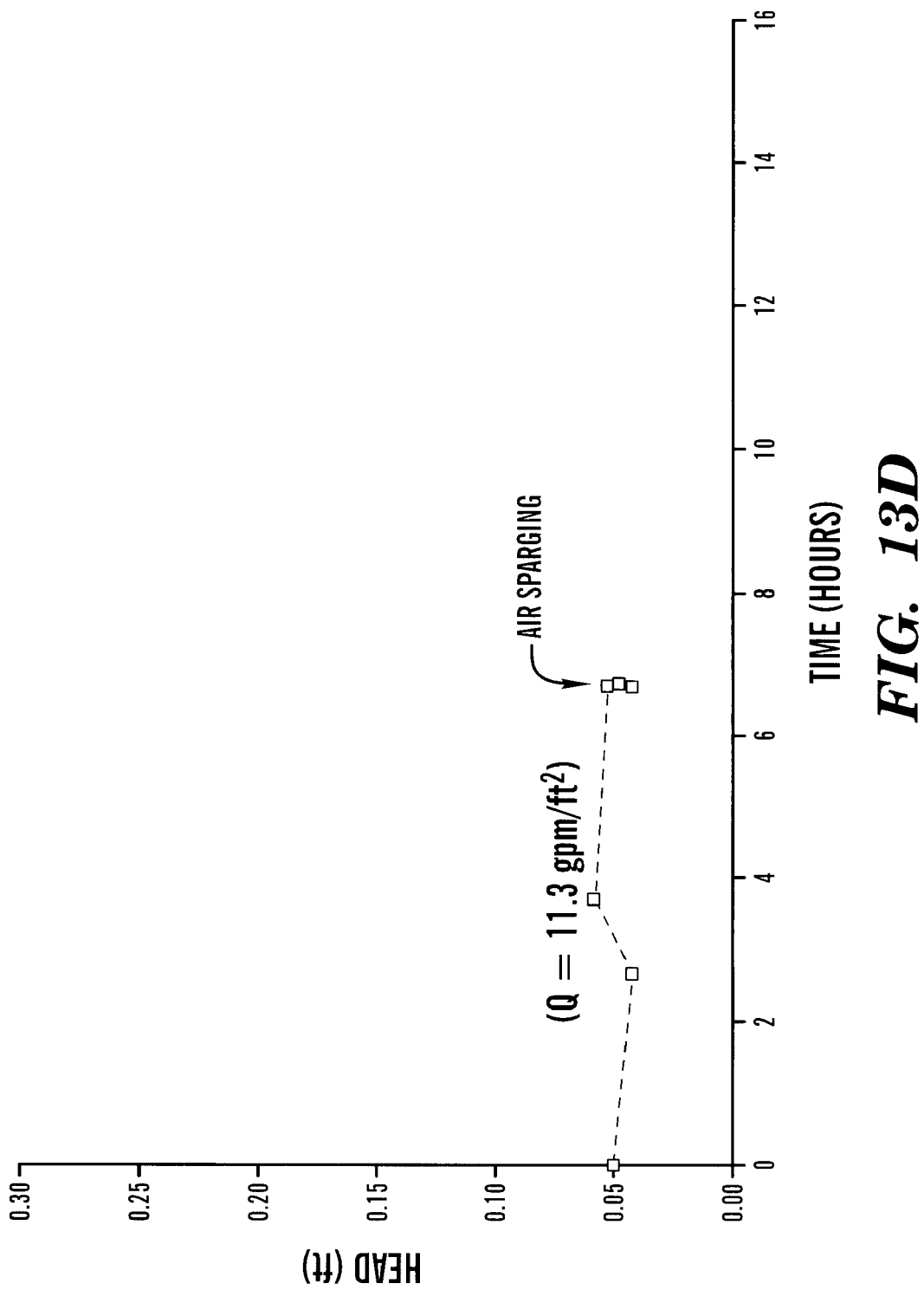

Fabric permitivities data is presented in Table 1 below and FIGS. 11–12. Results of fabric clogging and cleaning tests are shown in FIGS. 13A–D.

TABLE 1

| FABRIC | MANUFAC-TURER'S DATA ($gpm/ft^2$-in) | EXPERIMENTAL DATA | | |
|---|---|---|---|---|
| | | INITIAL ($gpm/ft^2$-in) | AFTER 12 HOURS ($gpm/ft^2$-in) | AFTER CLEANING ($gpm/ft^2$-in) |
| 8.6 oz. non-woven | 50 | | | |
| 4.8 oz. non-woven | 90 | | | |
| Woven monofilament | 20 | | | |
| 2 Layers, 8.6 oz. non-woven | | 8.4 | 3.1 | 11.4 |
| Woven monofilament + 8.6 oz. non-woven | | 11.2 | 4.7 | 8.6 |
| 2 Layers, 4.8 oz. non-woven | | 30.3 | 9.9 | 29.3 |
| Woven monofilament + 4.8 oz. non-woven | | 20.1 | (a) | (a) |

(a) no clogging was distinguishable after 8 hours

This testing showed that cleaning the boom curtain by air spraying resulted in increased flow through the boom curtain indicating that fouling material was removed from the boom curtain by the air sparging.

Example 2

Analysis of Curtain Designs for Water Flow Permitivity

Materials & Methods

Three types of curtain materials were tested for their permitivity to clean water and silty water. The three test curtain materials were compared to curtain material previously determined to be inadequate. The curtain materials were installed onto a framework that allowed the curtain materials to be placed in fiberglass tankage to measure the water flow (i.e,. permitivity) through the curtain materials. A pump delivered water into the tankage at variable rates, in gallons per minute. The opening size (i.e., through the framework supporting the curtain materials) was 10 square feet ($ft^2$). The three types of curtain material are as follows:

Reference Curtain 1: Single non-woven fabric sheet.
Reference Curtain 2: Double non-woven fabric sheet.
Test Curtain 1: Double fabric sheet, non-woven Amoco 4557 fabric.
Test Curtain 2: Double fabric sheet, non-woven Amoco 4557 fabric, with downstream sheet containing openings and trap valves (exemplary construction shown in FIG. 18).
Test Curtain 3: Double fabric sheet, non-woven Amoco 4557 fabric, with upstream sheet having 0.75 mm perforations uniformly spaced apart ¼ inch on center (exemplary construction shown in FIG. 17), and the downstream sheet containing openings and trap valves (exemplary construction shown in FIG. 18).

Baseline Permitivity Measurements

Reference curtains were placed into the framework and installed into the tankage to obtain permitivity data using clean water that was pumped into the tankage at various flow rates (in gallons per minute). Measurements for each curtain represent the head differential, which is the difference between the height of the water column on the inlet side of the curtain material as compared to the outlet side of the curtain material. The greater the head differential, the lower the permitivity. Head differentials of less than one inch are deemed to be suitable for most applications. The results of the baseline analysis are shown in Table 2.

TABLE 2

| Flow Rate (gpm) | Head Differential | | Change in Head Differential |
|---|---|---|---|
| | Reference Curtain 1 | Reference Curtain 2 | |
| 5 | ⅛ inch | 3/16 inch | 50% increase |
| 10 | ¼ inch | ⅜ inch | 50% increase |
| 15 | ⅜ inch | ½ inch | 34% increase |

The results of this test show the baseline results for curtain materials previously deemed to be unsuitable. These were used in later experiments to contrast the sufficiency of test curtains.

Permitivity Testing Using Clean Water

Individually, test curtains were placed into the framework and installed into the tankage to obtain permitivity data using clean water that was pumped into the tankage at various flow rates (in gallons per minute). As before, measurements for each curtain represent the head differential. The results of this analysis, as compared to the Reference Curtain 2, are shown in Table 3.

TABLE 3

| Flow Rate (gpm) | Head Differential | | | | Change in Head Differential, Comparison |
|---|---|---|---|---|---|
| | Reference Curtain 2 | Test Curtain 1 | Test Curtain 2 | Curtain 3 | Test of Reference Curtain 1 to Test Curtains 1, 2 and 3 |
| 5 | 3/16 inch | ⅛ inch | ⅛ inch | 3/32 inch | 33/33/50% reduction |
| 10 | ⅜ inch | ⅜ inch | 5/16 inch | 3/16 inch | 0/16/50% reduction |
| 15 | ½ inch | ⅝ inch | ½ inch | 5/16 inch | —/0/37% reduction |
| 20 | 13/16 inch | 13/16 inch | ¾ inch | ½ inch | 0/7/38% reduction |
| 25 | 1⅛ inch | 1 inch | 15/16 inch | 11/16 inch | 6/16/38% reduction |

The change in head differential between Reference Curtain 2 and Test Curtain 1 was insignificant. These curtains had nearly identical permitivities. In contrast, the change in head differential between Reference Curtain 2 and Test Curtains 2 on the whole showed a slight improvement over the range of flow rates even though the two curtains were indistinguishable at the 15 gpm flow rate. Test Curtain 3 exhibited consistently large improvements in the head differential over the entire range of flow rates. Thus, as compared to Reference Curtain 3, Test Curtain 2 showed slight improvements over Reference Curtain 2 and Test Curtain 3 showed significant improvements over Reference Curtain 2 for clean water permitivity.

Permitivity Testing Using Silt Laden Water

Test Curtain 2 and Test Curtain 3 were individually placed into the tankage and silt laden water was pumped through the tankage at various flow rates (in gallons per minute) to determine permitivity in adverse conditions. After noticeable fouling of the curtain material, air purging was conducted to remove fouling material (e.g., silt) from the curtain. The results of this analysis are shown in Table 4 and Table 5, respectively.

TABLE 4

| Flow Rate (gpm) | Head Differential Test Curtain 2 | | Time (minutes) |
|---|---|---|---|
| | Clean Water | Silty Water | |
| 5 | ⅛ inch | ⅛ inch | 5 |
| | | 5/32 inch | 10 |
| | | 3/16 inch | 20 |
| | | 7/32 inch | 25 |
| | | ¼ inch | 35 |
| | | 9/32 inch | 40 |
| | | ¼ inch | Purge |
| 10 | 5/16 inch | 7/16 inch | 1 |
| | | ½ inch | 5 |
| | | 9/16 inch | 15 |
| | | 11/16 inch | 20 |

TABLE 4-continued

| Flow Rate (gpm) | Head Differential Test Curtain 2 | | Time (minutes) |
|---|---|---|---|
| | Clean Water | Silty Water | |
| | | ¾ inch | 25 |
| | | ⅞ inch | 30 |
| | | 15/16 inch | 35 |
| | | 1 1/16 inch | 40 |
| | | ⅝ inch | Purge |
| 15 | ½ inch | 1¼ inch | 1 |
| | | 1⅜ inch | 5 |
| | | 1¾ inch | 10 |
| | | 1⅜ inch | Purge |

At 5 gpm, the inlet fabric of the curtain clogged slowly, but responded well after the air purge. At 10 gpm, the clogging occurred more quickly and the air purge resulted in acceptable, but not nearly as good permitivity. At 15 gpm, all readings were unacceptable, with clogging occurring very rapidly and no suitable recovery following the air purge.

TABLE 5

| Flow Rate (gpm) | Head Differential Test Curtain 3 | | Time (minutes) |
|---|---|---|---|
| | Clean Water | Silty Water | |
| 5 | 3/32 inch | ⅛ inch | 5 |
| | | ⅛ inch | 10 |
| | | ⅛ inch | 15 |
| | | ⅛ inch | 25 |
| 10 | 3/16 inch | 5/16 inch | 1 |
| | | 5/16 inch | 5 |
| | | 5/16 inch | 15 |
| | | 5/16 inch | 20 |
| | | 5/16 inch | 25 |
| | | 5/16 inch | 30 |
| 15 | 5/16 inch | 7/16 inch | 1 |
| | | ½ inch | 5 |
| | | ½ inch | 10 |
| | | 17/32 inch | 20 |
| | | 9/16 inch | 25 |

The results obtained using Test Curtain 3 suggest that the use of perforated fabric on the inlet side of the curtain may provide a curtain that will not clog at flow rates up to about 10 gpm, or clog so slowly that air purging can be performed periodically throughout the day. These permitivity properties of Test Curtain 3 in silty water suggest that this curtain would be useful for booms intended for long term installation in applications with light to moderate flow rate demands. Like the others, Test Curtain 3 also started to clog at 15 gpm, albeit at a much slower rate.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A method of controlling movement of suspended particulates or marine life in a body of water comprising:
   introducing into a body of water containing suspended particulates or marine life, a containment/exclusion boom comprising a curtain which comprises at least two sheets of a flexible fabric that control passage of suspended particulates or marine life through the curtain and
   injecting a gas into the water, between the at least two sheets of the curtain, in a manner effective substantially to remove fouling material from the curtain.

2. The method according to claim 1, wherein the gas is air.

3. The method according to claim 1, wherein the flexible fabric is a geosynthetic fabric.

4. The method according to claim 1, wherein the suspended particulates are selected from a group consisting of organic and inorganic matter.

5. The method according to claim 1, wherein the marine life is selected from a group consisting of mammals, amphibians, reptiles, fish, mollusca, crustaceans, and aquatic plantlife.

6. The method according to claim 1 wherein said injecting is carried out periodically.

7. The method according to claim 1, wherein said injecting a gas into the water comprises injecting the gas at a depth sufficient to allow the volume of the gas to expand as the gas rises to the water surface.

8. A method of cleaning fouling material from a boom curtain, the method comprising:
   providing a containment/exclusion boom comprising a curtain suspended in a body of water, the curtain comprising at least two sheets of a flexible fabric that control the passage of suspended particulates or marine life through the curtain and
   injecting a gas into the water, between the at least two sheets of the curtain, in a manner effective substantially to remove fouling material from the curtain.

9. The method according to claim 8, wherein the gas is air.

10. The method according to claim 8, wherein said injecting is carried out periodically.

11. The method according to claim 8, wherein said injecting a gas into the water comprises injecting the gas at a depth sufficient to allow the volume of the gas to expand as the gas rises to the water surface.

12. A containment/exclusion boom comprising:
    a support system adapted for placement in a body of water;
    a curtain comprising at least two sheets of a flexible fabric that allows movement of water therethrough and controls the passage of suspended particulates or marine life therethrough, said curtain being connected to said support system; and
    a gas injection system comprising at least one outlet positioned between the at least two sheets of said curtain, whereby gas injected into the water by said gas injection system is capable of substantially removing fouling material from said curtain.

13. The containment/exclusion boom according to claim 12, wherein said support system comprises at least one flotation unit.

14. The containment/exclusion boom according to claim 13, wherein the at least two sheets of flexible fabric comprises a first and second sheets of the flexible fabric, said first sheet having an upper edge, a lower edge, and a main sheet portion therebetween, said upper edge being folded along a lengthwise fold line and secured to the main sheet portion to form a first sleeve, said first sleeve receiving said at least one flotation unit.

15. The containment/exclusion boom according to claim 14, further comprising:
    an anchor connected to said lower edge of said first sheet.

16. The containment/exclusion boom according to claim 14, wherein said lower edge of said first sheet is folded along a lengthwise fold line and secured to said main sheet portion to form a second sleeve, the containment/exclusion boom further comprising:
    a ballast positioned within the second sleeve.

17. The containment/exclusion boom according to claim 14, wherein said second sheet of the flexible fabric comprises an upper edge secured to said first sheet and a lower edge secured to said first sheet.

18. The containment/exclusion boom according to claim 12, wherein said support system comprises a plurality of vertical pilings.

19. The containment/exclusion boom according to claim 18, wherein said support system further comprises at least one horizontal support member, each of said at least one horizontal support member being secured to and extending between two adjacent vertical pilings.

20. The containment/exclusion boom according to claim 19, wherein said curtain comprises first and second sheets of the flexible fabric, said first sheet having an upper edge and a lower edge, said upper edge being connected to said at least one horizontal support member.

21. The containment/exclusion boom according to claim 20, wherein said lower edge of said first sheet is folded along a lengthwise foldline and secured to said main sheet portion to form a sleeve, the containment/exclusion boom further comprising:

a ballast positioned in the sleeve.

22. The containment/exclusion boom according to claim 20, wherein said second sheet of the flexible fabric has an upper edge secured to said first sheet and a lower edge secured to said first sheet.

23. The containment/exclusion boom according to claim 12, wherein said at least two sheets comprises a first sheet of the flexible fabric having a plurality of perforations therethrough.

24. The containment/exclusion boom according to claim 23, wherein said at least two sheets further comprises a second sheet of the flexible fabric secured to said first sheet.

25. The containment/exclusion boom according to claim 12, wherein one of said at least two sheets of a flexible fabric includes at least one arrangement of openings formed therethrough and a valve flap secured to said one sheet below each said at least one arrangement of openings.

26. The containment/exclusion boom according to claim 12, wherein the gas is air.

27. The containment/exclusion boom according to claim 12, wherein the gas injection system comprises a compressor and a conduit in fluid communication with said compressor, said conduit having said at least one outlet.

28. The containment/exclusion boom according to claim 27, wherein the gas injection system further comprises manually operable valves.

29. The containment/exclusion boom according to claim 27, wherein the gas injection system further comprises automatically operable valves.

30. The containment/exclusion boom according to claim 23, wherein the gas injection system further comprises a diffuser attached to said at least one outlet of said conduit.

31. The containment/exclusion boom according to claim 12, wherein the flexible fabric is a geosynthetic fabric.

32. A method of reducing the energy transmission of a shock wave from an underwater explosion, the method comprising:

introducing into a body of water a first boom system which substantially surrounds a detonation site, the first boom system comprising a curtain having two sheets of flexible fabric and injecting a gas between the two sheets of flexible fabric, before detonation of an explosive at the detonation site, in a manner effective to reduce the transmission of energy of a shock wave resulting from detonation of the underwater explosive.

33. The method according to claim 32, wherein the first boom system further comprises:

a support system positioned in the body of water, wherein the curtain is connected to the support system in a manner allowing the curtain to extend substantially the entire depth of the body of water, and a gas injection system having at least one outlet positioned between the two sheets of flexible material, wherein said injecting is carried out by injecting the gas through said at least one outlet.

34. The method according to claim 32, further comprising after said introducing a first boom system:

introducing into the body of water a second boom system which substantially surrounds the first boom system, the second boom system comprising a curtain having two sheets of flexible fabric, wherein said injecting comprises injecting the gas between the two sheets of flexible fabric of the first and second boom systems.

35. A method of filtering intake water comprising:

securing a containment/exclusion boom in a body of water about a water intake system, the containment/exclusion boom comprising a support system adapted for placement in the body of water, a curtain comprising at least two sheets of a flexible fabric that allows movement of water therethrough and controls the passage of suspended particulates or marine life therethrough, the curtain being connected to the support system, and a gas injection system having at least one outlet positioned between the at least two sheets of the curtain, and injecting a gas into the water, between the at least two sheets of the curtain, in a manner effective substantially to remove fouling material from the curtain.

36. The method according to claim 35, wherein said injecting is carried out periodically.

37. The method according to claim 35, wherein said injecting a gas into the water comprises injecting the gas at a depth sufficient to allow the volume of the gas to expand as the gas rises to the water surface.

38. A method of reducing the energy transmission of shock or sound waves following an underwater event producing such waves, the method comprising:

introducing into a body of water a first boom system which substantially surrounds a site of an underwater event that produces shock or sound waves, the first boom system comprising a curtain having two sheets of flexible fabric and injecting a gas between the two sheets of flexible fabric, before the occurrence of the underwater event, in a manner effective to reduce the transmission of energy of the shock or sound waves resulting from the underwater event.

* * * * *